(12) United States Patent
Oe et al.

(10) Patent No.: US 11,399,212 B2
(45) Date of Patent: Jul. 26, 2022

(54) TERMINAL DEVICE APPLICATION PROGRAM, TERMINAL DEVICE CONTROL METHOD, TERMINAL DEVICE, AND LIVE BROADCAST DISTRIBUTION SERVER PROGRAM PROVIDING QUESTIONNAIRE CREATION BY TERMINAL DEVICE

(71) Applicant: DWANGO Co., Ltd., Tokyo (JP)

(72) Inventors: Junya Oe, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/603,197

(22) PCT Filed: Apr. 3, 2018

(86) PCT No.: PCT/JP2018/014289
§ 371 (c)(1),
(2) Date: Oct. 4, 2019

(87) PCT Pub. No.: WO2018/186405
PCT Pub. Date: Oct. 11, 2018

(65) Prior Publication Data
US 2020/0351552 A1  Nov. 5, 2020

(30) Foreign Application Priority Data
Apr. 5, 2017 (JP) .............................. JP2017-075292

(51) Int. Cl.
*H04N 21/442* (2011.01)
*H04N 21/2187* (2011.01)
(Continued)

(52) U.S. Cl.
CPC ....... *H04N 21/44222* (2013.01); *A63F 13/35* (2014.09); *A63F 13/63* (2014.09);
(Continued)

(58) Field of Classification Search
CPC ......... H04N 21/44222; H04N 21/2187; H04N 21/2743; A63F 13/35; A63F 13/63;
(Continued)

(56) References Cited

U.S. PATENT DOCUMENTS

2009/0222551 A1* 9/2009 Neely .................... G06Q 30/02
709/224
2012/0268553 A1* 10/2012 Talukder ............. H04L 65/1093
348/14.08
(Continued)

FOREIGN PATENT DOCUMENTS

| CN | 101127875 B | 1/2012 |
|---|---|---|
| CN | 104754396 A | 7/2015 |

(Continued)

OTHER PUBLICATIONS

English Translation of Decision of Refusal received in JP Application No. 2017-075292 dated Dec. 6, 2017.
(Continued)

*Primary Examiner* — Alfonso Castro
(74) *Attorney, Agent, or Firm* — Dorsey & Whitney LLP

(57) ABSTRACT

A terminal device application program, a terminal device control method, a terminal device, and a live-broadcast distribution server program that can distribute content such as a questionnaire without delaying the progress of the distribution of a live-broadcast program even when an assistant cannot be provided next to [a distributor] are provided. The application program for the terminal device 3, having a function to communicate with a live-broadcast distribution server 1 that has a distribution function of a live-broadcast program, wherein the application program makes a computer of the terminal device 3 function as an authority granting unit 32 that grants authority to create content to a part of or all viewers, a viewer content creation unit 32 that enables content creation by a viewers who has
(Continued)

been granted authority to create content, and a content distribution unit 32 that incorporates content created by a viewer into a program being live-broadcasted, based on an instruction by a live-broadcast distributor or the viewer who created content.

20 Claims, 15 Drawing Sheets

(51) Int. Cl.
*H04N 21/2743* (2011.01)
*A63F 13/35* (2014.01)
*A63F 13/63* (2014.01)
*A63F 13/86* (2014.01)
*A63F 13/87* (2014.01)

(52) U.S. Cl.
CPC .............. *A63F 13/86* (2014.09); *A63F 13/87* (2014.09); *H04N 21/2187* (2013.01); *H04N 21/2743* (2013.01); *A63F 2300/407* (2013.01); *A63F 2300/572* (2013.01); *A63F 2300/577* (2013.01); *A63F 2300/6018* (2013.01)

(58) Field of Classification Search
CPC .... A63F 13/86; A63F 13/87; A63F 2300/407; A63F 2300/572; A63F 2300/577; A63F 2300/6018
USPC .......................................................... 725/24
See application file for complete search history.

(56) References Cited

U.S. PATENT DOCUMENTS

| | | | | |
|---|---|---|---|---|
| 2016/0149841 | A1* | 5/2016 | Lewis | G06F 3/04842 715/752 |
| 2016/0370954 | A1* | 12/2016 | Burningham | H04L 67/32 |
| 2017/0064353 | A1 | 3/2017 | Kim et al. | |
| 2018/0255361 | A1* | 9/2018 | Dharmaji | H04N 21/4753 |

FOREIGN PATENT DOCUMENTS

| | | | |
|---|---|---|---|
| CN | 105704520 | A | 6/2016 |
| CN | 106331754 | A | 1/2017 |
| JP | 2002057642 | A | 2/2002 |
| JP | 2002125164 | A | 4/2002 |
| JP | 2002189836 | A | 7/2002 |
| JP | 2002359830 | A | 12/2002 |
| JP | 2004135320 | A | 4/2004 |
| JP | 2005039598 | A | 2/2005 |
| JP | 2005301756 | A | 10/2005 |
| JP | 2010213129 | A | 9/2010 |
| JP | 2011154496 | A | 8/2011 |
| JP | 2011175559 | A | 9/2011 |
| JP | 2013222390 | A | 10/2013 |
| JP | 2015056761 | A | 3/2015 |
| JP | 2015534304 | A | 11/2015 |
| WO | 2017043332 | A1 | 3/2017 |

OTHER PUBLICATIONS

English Translation of Decision to Grant a Patent received in JP Application No. 2017-05292 dated Aug. 29, 2018.

English Translation of Notice of Transfer of a Case for Reconsideration by Examiners before Appeal Proceedings received in JP Application No. 2017-075292 dated May 8, 2018.

Matsumae, Kentaro, "The iPhone application of Nico Nico Live in this way the born Nikkei software, Japan", Nikkei BP, Aug. 24, 2010, the 13th volume, No. 10, p. 18-23.

Nishimura, et al., "of smile channel establishment, the video salon", Jul. 2012 item, Japan, Genko-Sha, Inc., Jul. 1, 2012, the 64th volume, No. 1, p. 58-63.

Taro, et al., "An extortion theft case and comics Infiltration! Experience! the doubtful spot, Japan", Core Magazine, Mar. 9, 2015, the core comic 403, and p. 295-298.

[English Translation] 1st Chinese Office Action for CN Application No. 201880023343.6, dated Apr. 26, 2021.

* cited by examiner

TERMINAL DEVICE APPLICATION PROGRAM, TERMINAL DEVICE CONTROL METHOD, TERMINAL DEVICE, AND LIVE BROADCAST DISTRIBUTION SERVER PROGRAM PROVIDING QUESTIONNAIRE CREATION BY TERMINAL DEVICE

RELATED APPLICATIONS

This application is a 371 National Stage application claiming priority to International Application No, PCT/JP2018/014289, filed Apr. 3, 2018, which claims priority to Japanese Patent Application No. 2017-075292, filed on Apr. 5, 2017. The aforementioned applications are incorporated herein by reference, in its entirety, for any purposes.

TECHNICAL FIELD

The present invention relates to a terminal device application program, a terminal device control method, terminal device, and a live-broadcast distribution server program.

BACKGROUND TECHNOLOGY

Conventionally, a game system has been provided, in which a game player films himself/herself playing a game with a camera and live-streams the game along with the film of the player himself/herself. Among such game systems, some have a function where a player live-streaming can accept responses to a questionnaire from the viewers, as in Patent Literature 1.

In the game system according to Patent Literature 1, questionnaire questions and response options are entered into a mobile terminal device such as a smartphone, separate from a game device, and the questionnaire questions and response options are sent from the mobile terminal device to the game device. Also, questionnaire questions and response options received by the game device are sent to a server through a network and distributed to viewer game devices, etc. from the server.

Additionally, other than the game device, in a service that distributes a live-broadcast program via the Internet, a service with a questionnaire function has been provided.

PRIOR ART LITERATURE

Patent Literature

Patent Literature 1: Japanese Patent Application Publication No. 2015-230685

SUMMARY OF THE INVENTION

Problems to be Solved by the Invention

However, in order for a game player or a user distributing a live-broadcast program to distribute content such as a questionnaire by himself/herself while playing the game or distributing a live-broadcast program, a player needed to use a distribution function of content such as a questionnaire apart from the distribution of original live-broadcast content. As a result, the live game streaming or the progress of the live-broadcast program were sometimes delayed.

If an assistant is provided separately, the game player or the user distributing a live-broadcast program would not have to conduct a questionnaire by himself/herself. However, in reality, there are many players who play a game alone or users who distribute a live-broadcast program alone. Thus, it is difficult to provide an assistant in such case. Additionally, even when an assistant can be provided, the assistant is not necessarily needed at all time. Thus, there is a problem that the game player/user cannot respond to a situation when the assistant is needed unexpectedly.

Therefore, the present invention aims to provide a terminal device application program, a terminal device control method, a terminal device, and a live-broadcast distribution server program that can distribute content such as a questionnaire without delaying the progress of distribution of a live-broadcast program even when an assistant cannot be provided next to a player himself/herself.

Means for Solving the Problem

In order to solve the problem, one aspect of a terminal device application program according to the present invention includes a terminal device application program having a function to communicate with a live-broadcast distribution server that has a distribution function of a live-broadcast program, wherein the application program enables a computer of the terminal device to function as an authority granting unit that grants authority to create content to a part of or all viewers based on an instruction by a live-broadcast distributor, a viewer content creation unit that enables content creation by a viewer (viewers) who has (have) been granted authority to create content, and a content distribution unit that incorporates the content created by the viewer(s) into a program being live-broadcasted based on an instruction by a live-broadcast distributor or the viewer(s) who created the content.

In this description, a "live-broadcast program" is a concept including not only a program in which a distributor distributes an image filmed with his/her camera in real time, but also a program in which a video recorded in a repeatedly playable manner is distributed as being played. In this description, a "content" is a concept including a questionnaire distributed during a live-broadcast program, other live-broadcast programs distributed in a predetermined region of a display screen of a live-broadcast program, etc. In this description, "authority" is a concept including enabling of creating a part of or all content by the viewer, which originally only a distributor could create.

According to the aspect, a computer of a terminal device functions as follows by executing the application program: An authority granting unit grants authority to create content to a part of or all viewers based on an instruction by a live-broadcast distributor. A viewer content creation unit enables content creation by a viewer (viewers) who has (have) been granted authority to create content. A content distribution unit incorporates the content created by the viewer(s) into a program being live-broadcasted based on an instruction by the live-broadcast distributor or the viewer(s) who created the content. Therefore, since the live-broadcast distributor can request a part of or all viewers to create content, and distribute the created content, the distributor can distribute content such as a questionnaire without delaying the progress of the live-broadcast distribution even when the live-broadcast distributor cannot provide an assistant next to himself/herself.

Another aspect of the present invention includes the authority granting unit, wherein a type of content to be created and a scope of the authorization to create content are decided. According to this aspect, it is expected that content desired by a distributor is created even when the authority to create content is granted to a person other than the distributor.

Another aspect of the present invention is characterized by the fact that the type of content includes a questionnaire or a live-broadcast program distributed along with the live-broadcast program. According to this aspect, the distributor can jointly distribute a live-broadcast program while avoiding cumbersome tasks even when the distributor cannot provide an assistant next to himself/herself.

Another aspect of the present invention includes the application program, wherein the computer of the terminal device is further made to function as a content confirmation unit that enables confirmation of the content created by the viewer(s). According to this aspect, the content confirmation unit enables confirmation of content created by the viewer(s). Therefore, it is expected that content desired by the live-broadcast distributor is created even when the distributor requests the viewer(s) to create content.

Another aspect of the present invention includes the application program, wherein the computer of the terminal device is further made to function as a distribution permission decision unit that decides whether to approve distribution of the content created by the viewer(s). According to this aspect, the distribution permission decision unit decides whether to approve distribution of the content created by the viewer(s). Therefore, it is expected that content desired by the live-broadcast distributor is distributed even when the distributor requests the viewer(s) to create content.

Another aspect of the present invention includes the authority granting unit, which grants the authority to create content to the other users who are randomly extracted or the viewer under a specific condition. According to this aspect, since the distributor can request other users to create content, the distributor can distribute content such as a questionnaire without delaying the progress of distribution of a live-broadcast program.

Another aspect of the present invention includes a scope of the authority to create content, which includes at least one of a time restriction for creating the content and a display limitation of the content creation. According to this aspect, it is expected that content desired by the distributor is created even when the authority to create content is granted to a person other than the distributor.

In order to solve the problem, one aspect of a terminal device control method according to the present invention includes a terminal device control method having a function to communicate with the live-broadcast distribution server that has a distribution function of a live-broadcast program, wherein the control method grants authority to create content to a part of or all viewers based on an instruction by a live-broadcast distributor, enables content creation by a viewer who has been granted authority to create content, and incorporates the content created by the viewer into a program being live-broadcasted based on an instruction by a live-broadcast distributor or the viewer who created the content.

According to the aspect, authority to create content is granted to a part of or all viewers based on an instruction by a live-broadcast distributor. The viewer(s) who has (have) been granted authority to create content can create content. Content created by the viewer(s) is incorporated into a program being live-broadcasted based on an instruction by the live-broadcast distributor or the viewer(s) who created the content. Therefore, since the live-broadcast distributor can request a part of or all viewers to create content and distribute the created content, the distributor can distribute content such as a questionnaire without delaying the progress of the live-broadcast distribution even when the live-broadcast distributor cannot provide an assistant next to himself/herself.

In order to solve the problem, one aspect of a terminal device according to the present invention includes a terminal device having a function to communicate with a live-broadcast distribution server that has a distribution function of a live-broadcast program, wherein the terminal device includes an authority granting unit that grants authority to create content to a part of or all viewers based on an instruction by a live-broadcast distributor, a viewer content creation unit that enables content creation by a viewer who has been granted authority to create content, and a content distribution unit that incorporates the content created by the viewer into a program being live-broadcasted based on an instruction by a live-broadcast distributor or the viewer who created the content.

According to the aspect, the authority granting unit grants authority to create content to a part of or all viewers based on an instruction by the live-broadcast distributor. The viewer content creation unit enables content creation by the viewer(s) who has (have) been granted authority to create content. The content distribution unit incorporates the content created by the viewer(s) into a program being live-broadcasted based on an instruction by the live-broadcast distributor or the viewer(s) who created content. Therefore, since the live-broadcast distributor can request a part of or all viewer to create content, and distribute the created content, the distributor can distribute content such as a questionnaire without delaying the progress of the live-broadcast distribution even when the live-broadcast distributor cannot provide an assistant next to himself/herself.

In order to solve the problem, one aspect of a live-broadcast distribution server program according to the present invention includes a live-broadcast distribution server program that is able to distribute a live-broadcast program, wherein the program enables a computer of the live-broadcast distribution server to function as an authority granting unit that grants authority to create content to a part of or all viewers based on an instruction by a live-broadcast distributor, a viewer content creation unit that enables content creation by a viewer who has been granted authority to create content, and a content distribution unit that incorporates the content created by the viewer into a program being live-broadcasted based on an instruction by a live-broadcast distributor or the viewer who created the content.

According to the aspect, by making a computer of the live-broadcast distribution server execute the live-broadcast distribution server program, the authority granting unit grants authority to create content to a part of or all viewers based on an instruction by a live-broadcast distributor. The viewer content creation unit enables content creation by the viewer(s) who has (have) been granted authority to create content. The content distribution unit incorporates the content created by the viewer(s) into a program being live-broadcasted based on an instruction by the live-broadcast distributor or the viewer(s) who created content. Therefore, since the live-broadcast distributor can request a part of or all viewers to create content, and distribute the created content, the distributor can distribute content such as a questionnaire without delaying the progress of the live-broadcast distribution even when the live-broadcast distributor cannot provide an assistant next to himself/herself.

Effect of the Invention

According to the present invention, a distributor can distribute content such as a questionnaire without delaying the progress of the distribution of a live-broadcast program even when the distributor cannot provide an assistant next to himself/herself.

BEST MODE FOR CARRYING OUT THE INVENTION

First Embodiment

Figure 1:
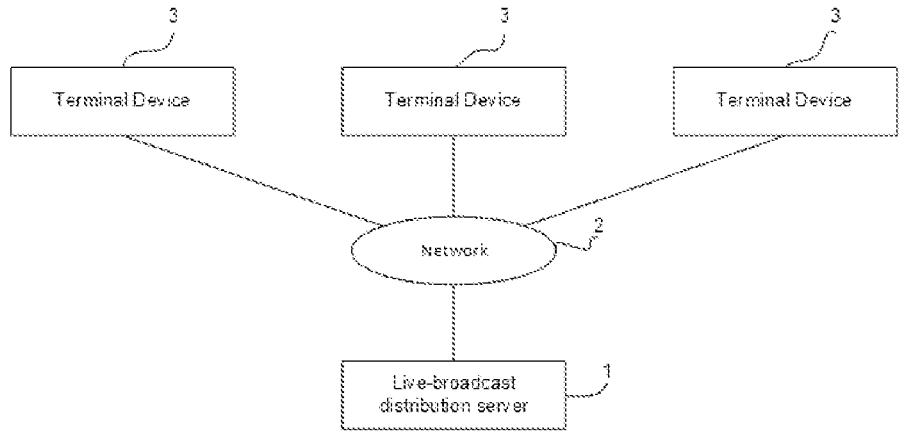
FIG. 1 The figure is a schematic diagram showing a live-broadcast distribution system of a first embodiment of the present invention.
Figure 2:
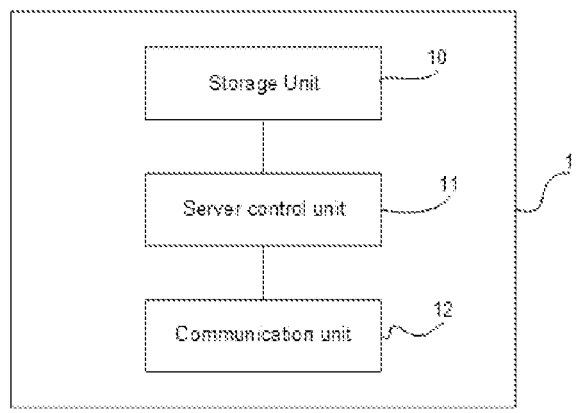
FIG. 2 The figure is a schematic block diagram showing a configuration of a live-broadcast distribution server of the first embodiment.
Figure 3:
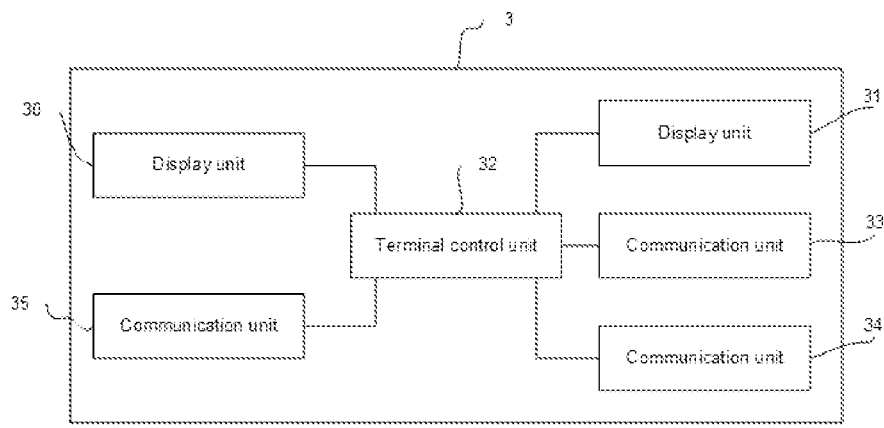
FIG. 3 The figure is a schematic block diagram showing a configuration of a terminal device of the first embodiment.

Hereinafter, the first embodiment will be described with reference to the drawings. FIG. 1 is a schematic diagram showing a live-broadcast distribution system of the first embodiment of the present invention. FIG. 2 is a schematic block diagram showing a configuration of a live-broadcast distribution server of the first embodiment. FIG. 3 is a schematic block diagram showing a configuration of a terminal device of the first embodiment.

(Live-Broadcast Distribution System)

As shown in FIG. 1, a live-broadcast distribution system of the first embodiment of the present invention provides a live-broadcast distribution server 1, a network 2 such as the Internet, and a terminal device 3 that is connected to the live-broadcast distribution server 1 via the network 2. The terminal device 3 includes the terminal device 3 of a distributor who distributes a live-broadcast program and the terminal device 3 of a viewer who views the live-broadcast program.

The live-broadcast distribution server 1 provides a webpage for providing video data of the live-broadcast program (hereinafter a "webpage for selecting a program") to the terminal device 3 of a user who becomes a viewer. Also, the live-broadcast distribution server 1 stores metadata of each video data. The metadata of the video data of this embodiment are character strings (video tags) indicating the video data classification. The webpage for selecting a program includes a URL (Uniform Resource Locater) for viewing a live-broadcast program and metadata of the video data.

The live-broadcast distribution server 1 distributes a plurality of live-broadcast programs. The live-broadcast distribution server 1 distributes the video data of the live-broadcast programs to the terminal device 3, which is the requester. This distribution is carried out by, for example, streaming.

Additionally, the live-broadcast distribution system of this embodiment enables the viewer(s) to post comments as they view any of the live-broadcast programs. The posting and distribution of comments is carried out by a comment distribution server not shown in FIG. 1. The comment distribution server accepts comment posting for live-broadcast programs from the terminal device 3 via the network 2. A data format of comments may be a text format. The comment distribution server stores the text data of the comment, of which the posting has been accepted, by linking to the live-broadcast program, to which the comment was posted. Here, a "comment" is a concept including not only the comments in text data but also stamps, link information, sound data, etc. The comment distribution server distributes the comment to the terminal device 3 when there is an inquiry from the terminal device 3 and a comment linking to the live-broadcast program has been stored. Consequently, when a viewer selects the title of a desired live-broadcast program and views the live-broadcast program, the comment is displayed on the screen of the live-broadcast program displayed on the terminal device 3.

As shown in FIG. 2, the live-broadcast distribution server provides a storage unit 10, a server control unit 11, and a communication unit 12. The storage unit 10 is configured with, for example, an HDD (Hard Disk Drive), etc. The storage unit 10 stores the live-broadcast distribution server program 1 of the present invention. The communication unit 12 is the interface for data communication using the network 2 and controlled by the server control unit 11. As an example, this embodiment uses the Internet for the network 2, and the communication unit 12 is the interface for data communication via the Internet. The live-broadcast distribution server 1 can communicate with the terminal device 3 through the network 2.

The server control unit 11 is configured with a CPU, etc. and controls [tasks] related to the distribution of live-broadcast programs by executing a program stored in the storage unit 10. The server control unit 11 receives a user of the distributor and a request for distributing a live-broadcast program from the terminal device 3 of the distributor who distributes live-broadcast programs.

When the viewer displays a webpage for selecting a program on the terminal device 3 and selects a desired live-broadcast program by clicking on it, a request for viewing the live-broadcast program is sent to the live-broadcast distribution server from the terminal device 3 of the viewer. The server control unit 11 receives the request for viewing from the terminal device 3, sends a program ID and distributes the live-broadcast program to the terminal device 3. Additionally, the server control unit 11 measures and records the number of the viewer(s) based on the request(s) for viewing.

As shown in FIG. 3, the terminal device 3 provides a display unit 30, an input unit 31, a terminal control unit 32, a play unit 33, a storage unit 34, and a communication unit 35. The terminal device 3 has a function that enables it to communicate with various servers via the network 2. The terminal device 3 may be, for example, a cellular phone, a smart phone, a mobile terminal such as an information terminal device, etc., a PC, a game console, a television device, etc. The display unit 30 is configured with a liquid crystal display, etc. of a cellular phone, a smart phone, a mobile terminal such as an information terminal device, a PC, a game console, and a television device, etc. Some examples of the display unit 30 may be an HMD (Head Mounted Display) such as VR (Virtual Reality), MR (Mixed Reality), AR (Augmented Reality), etc. Additionally, smart glasses may be used as the display unit 30. Further, a projector may be used as the display unit 30.

The input unit 31 conducts input of operation instructions by the distributor or a user who is the viewer, and input of comments, etc. The input unit 31 is configured with, for example, a touch panel integrated into the display unit 30, and a keyboard, etc. The input unit 31 also includes a microphone for inputting sound. Further, in this embodiment, the input unit 31 includes a camera.

In the terminal device 3, the application program of the present invention has been downloaded and installed in advance from an application program distribution server not shown here. The terminal control unit 32 is configured with a CPU, etc. and functions as an authority granting unit, a viewer content creation unit, and a content distribution unit by executing the application program. The terminal control unit 32 controls the display unit 30, the input unit 31, the play unit 33, the storage unit 34, and the communication unit 35. The terminal control unit 32 receives video data of, or comments for, a live-broadcast program distributed by the live-broadcast distribution server 1 and displays them at the display unit 30. Additionally, the terminal control unit 32 receives video data of a live-broadcast program distributed by the live-broadcast distribution server 1 and plays them at the play unit 33. Further, the terminal control unit 32 receives text data, etc. of comments distributed from the comment distribution server and displays them at the display unit 30.

The play unit 33 is configured with an amplifier as well as a speaker, etc. and plays video data of a live-broadcast program based on the control by the terminal control unit 32. The storage unit 34 stores data distributed from the application program and the live-broadcast distribution server 1, as well as data distributed from the comment distribution server.

The communication unit 35 is the interface for data communication using the network 2 and controlled by the terminal control unit 32. In this embodiment, as an example, the Internet is used for the network 2, and the communication unit 35 is the interface for data communication via the Internet.

(Interface for Distributing a Live-Broadcast Program)

Figure 4:
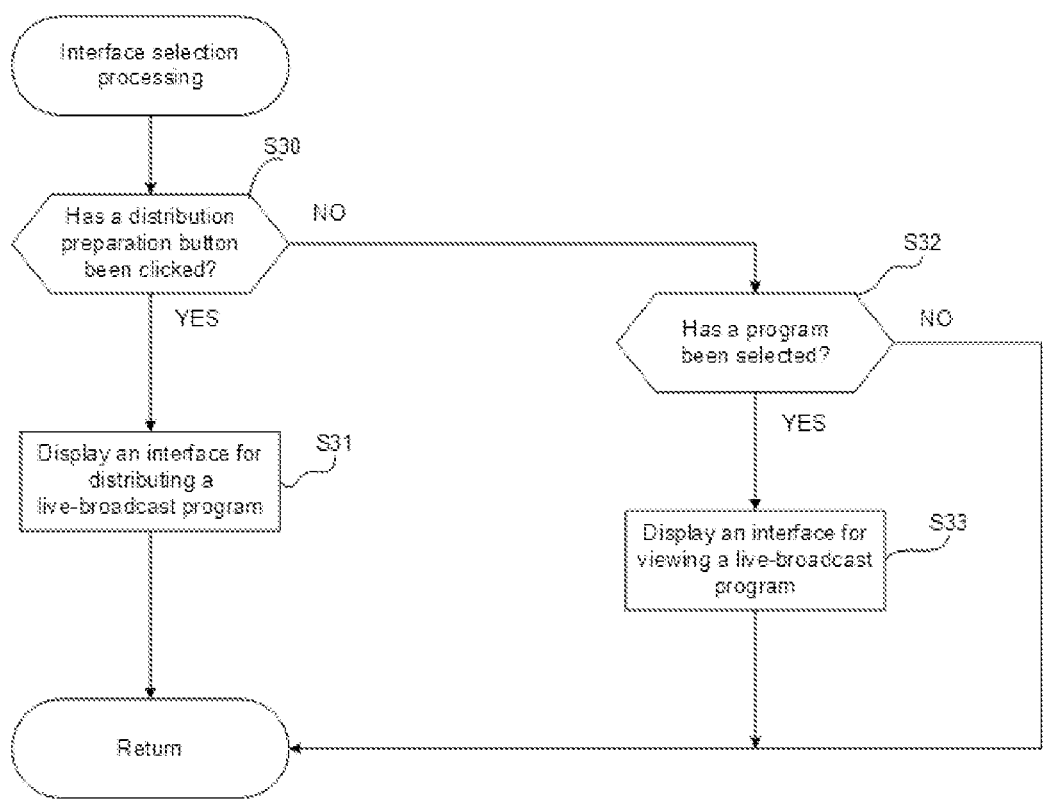
FIG. 4 The figure is a flowchart showing a routine of interface selection processing of a terminal device.
Figure 5:
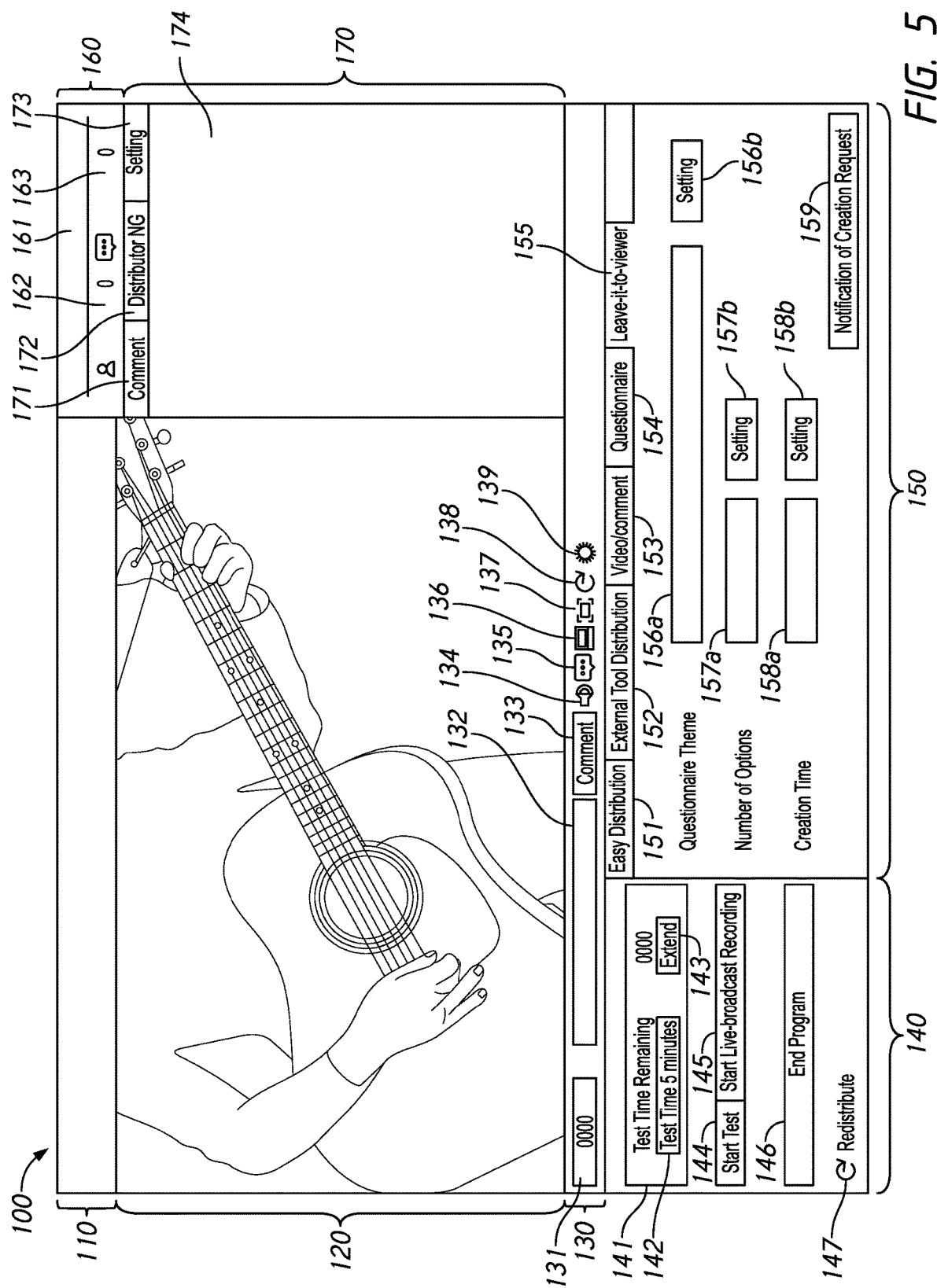
FIG. 5 The figure shows an example of an interface for distributing a live-broadcast program.

Next, an interface for distributing a live-broadcast program in the live-broadcast distribution system of this embodiment will be described. FIG. 4 is a flowchart showing a routine of interface selection processing of the terminal device 3. FIG. 5 shows an example of an interface for distributing a live-broadcast program 100. When distributing a live-broadcast program, for example, a user starts an application program, or starts a browser, on the terminal device 3 and displays a webpage for selecting a program (not shown here) on the display unit 30. When the webpage for selecting a program is displayed, the terminal control unit 32 executes the interface selection processing routine shown in FIG. 4 at a predetermined time interval. In the webpage for selecting a program, a distribution preparation button that prepares the distribution of a live-broadcast program is displayed. The terminal control unit 32 of the terminal device 3 determines whether the distribution preparation button was clicked, as shown in FIG. 4 (FIG. 4: S30). When the distribution preparation button was clicked (FIG. 4: S30; YES), the terminal control unit 32 displays the interface for distributing a live-broadcast program 100 at the display unit 30 (FIG. 4: S31). Other processing shown in FIG. 4 will be described later.

As shown in FIG. 5, the interface for distributing a live-broadcast program 100 provides an administrative comment display area 110, a program display area 120, a first operation area 130, a test operation area 140, a second operation area 150, a participation status display area 160, and a display field for comments, etc. 170. Comments by an administrator of the live-broadcast distribution system are posted to the administrative comment display area 110 by the terminal device 3 of the distributor or the live-broadcast distribution server 1. A live-broadcast program is displayed on the program display area 120. When a comment is posted, the comment is also displayed on the program display area 120.

The first operation area 130 provides an elapsed time display area 131, a distributor comment input field 132, a distributor comment posting button 133, a speaker icon 134, a comment display icon 135, an NG sharing function icon 136, a screen mode change icon 137, an update icon 138, and a setting icon 139.

The elapsed time display area 131 displays elapsed time of a live-broadcast program. In this embodiment, as an example, the elapsed time from the start of distributing a live-broadcast program is measured at the live-broadcast distribution server 1, and the elapsed time data is sent to the terminal device 3. The terminal device 3 displays the elapsed time data received from the live-broadcast distribution server 1 at the elapsed time display area 131.

The distributor comment input field 132 is a rectangular field for the distributor to input his/her comments in the form of text, etc. The distributor comment posting button 133 is a button to post texts, etc. entered in the distributor comment input field 132.

The speaker icon 134 is an icon that turns on and off the sound output. The state shown in FIG. 5 illustrates that the sound output is on. When the speaker icon 134 is clicked in the state shown in FIG. 5, an "X" mark, for example, is displayed on the speaker icon and the sound output is turned off.

The comment display icon 135 is an icon to turn on or off the comment display. The state shown in FIG. 5 illustrates that the comment display is on. When the comment display icon 135 is clicked in the state shown in FIG. 5, an "X" mark, for example, is displayed on the comment display icon 135 and the comment display on the program display area 120 is turned off.

The NG sharing function icon 136 is an icon to set a filtering level in order to hide unpleasant comments. The filtering level can be selected from "high," "medium," and "low." The screen mode change icon 137 is a button to switch screen mode. The screen mode includes a first mode, which displays the administrative display area 110, the program display area 120, the participation status display area 160, and the display field for comments, etc. 170; a second mode, which displays the administrative comment display area 110 and the program display area 120; and a third mode, which displays in full screen the administrative comment display area 110 and the program display area 120. In the state shown in FIG. 5, the first mode is selected as the screen mode.

The update icon 138 is an icon for recovering normal operation when the image or sound of a live-broadcast program has stopped. Clicking the update icon 138 reloads [data]. The setting icon 139 is an icon to switch on/off the display of the participation status display area 160 and the display field for comments, etc. 170, as well as to make setting such as switching on/off the display of anonymous comments. An anonymous comment is a comment entered by a user with an encrypted ID.

The test operation unit 140 provides a remaining time display area 141, a test start button 144, a live-broadcast start button 145, a program stop button 146, and a redistribution button 147. The remaining time display area 141 displays the remaining time of a test broadcast once the test broadcast starts, and the remaining time of a real broadcast once the live broadcast starts. Additionally, the remaining time display area 141 displays a time setting button 142 and an extension button 143. The time setting button 142 sets broadcast time in five-minute increments for test broadcast and extensions in 30-minute increments for live broadcast. The extension button 143 is a button to extend broadcast time in five-minute increments for test broadcast and to extend broadcast for the amount of time set by the time setting button 142 for live broadcast.

The test start button 144 is a button to start test broadcast. Clicking the test start button 144 starts test broadcast. The live-broadcast start button 145 is a button to start live broadcast. Clicking the live-broadcast start button 145 starts live broadcast. The program stop button 146 is a button to stop broadcast in the middle. Clicking the program stop button 146 stops broadcast. The redistribution button 147 is an icon for recovering normal operation when an image or sound stops during broadcast. Clicking the redistribution icon 147 reloads [data].

The second operation area 150 provides an easy distribution tab 151, an external tool distribution tab 152, a video/comment tab 153, a questionnaire tab 154, and a leave-it-to-viewer tab 155. The easy distribution tab 151 is a tab to make setting for performing easy distribution. The easy distribution is to distribute a live-broadcast program, without using external tools, by making setting in a settings screen displayed by clicking the easy distribution tab 151. In the settings screen of the easy distribution tab 151, settings of image-focus versus sound quality focus, resolution, and sound volume, etc. can be made.

The external tool distribution tab 152 is a tab to make settings when distribution uses external tools that enable distribution of higher quality image and sound than the easy distribution. The settings screen of the external tool distribution tab 152 displays buttons, etc. for entering information in order to log in external tools and execute the login.

The video/comment tab 153 is a tab to make settings, without using a camera and microphone, when distributing a live-broadcast program by using a video that has been recorded in advance. The settings screen is displayed by clicking the video/comment tab 153 and displays an information input field for specifying a video as well as buttons, etc. for setting display/non-display of a comment displayed in the video.

The questionnaire tab 154 is a tab for a distributor to create a questionnaire. The settings screen is displayed by clicking the questionnaire tab 154 and displays an input field for questions and options, a question setting button, and a result display button, etc.

The leave-it-to-viewer tab 155 is a tab to make settings when requesting the viewer(s) to create a questionnaire. FIG. 5 illustrates the state where the leave-it-to-viewer tab 155 has been clicked. As shown in FIG. 5, the settings screen displayed by clicking the leave-it-to-viewer tab 155 displays a questionnaire theme input field 156, a input field for the number of options 157, a input field for creation time 158, and a creation request notification button 159.

The questionnaire theme input field 156 is a field for entering a theme of a questionnaire which the viewer is requested to create. When the viewer is requested to create a questionnaire, the distributor sets the theme of the questionnaire and enter it in the questionnaire theme input field 156.

The input field for the number of options 157 is a field for entering the number of response options for a questionnaire which the viewer is requested to create. The distributor sets the number of response options for the questionnaire which the viewer is requested to create and enters the number of options in the input field for the number of options 157.

The input field for creation time 158 is a field for entering time to create a questionnaire that the viewer is requested to create. The distributor sets a time restriction for creating a questionnaire and enters the time restriction in the input field for creation time 158. The creation request notification button 159 is a button to be used when executing a questionnaire creation request to the viewer. Clicking the creation request notification button 159 sends a questionnaire creation request to the live-broadcast distribution server 1 from the terminal device 3.

The participation status display area 160 provides a display area for order of precedence 161, a display area for the number of viewers 162, and a display area for the number of comments 163. The display area for order of precedence 161 displays the sequential order that the user viewed the content or the ranking where the viewer stands, when restriction or ranking is placed on the number of content viewers. The user ID of the distributor who is distributing a live-broadcast program displayed at the program display area 120 is displayed. The display area for the number of viewers 162 displays the number of viewers of a live-broadcast program displayed at the program display area 120. As an example, this embodiment is configured in such a way that the number of viewers of a live-broadcast program is measured at the live-broadcast distribution server 1, the data on the number of viewers sent from the live-broadcast distribution server 1 is received by the terminal device 3, and the data is displayed on the distributor ID display area 161.

The display area for the number of comments 163 displays the number of comments for a live-broadcast program displayed at the program display area 120. As an example, this embodiment is configured in such a way that the number of comments for a live-broadcast program is measured at the live-broadcast distribution server 1, the data on the number of comments sent from the live-broadcast distribution server 1 is received by the terminal device 3, and the data is displayed at the display area for the number of comments 163.

The display field for comments, etc. 170 provides a comment tab 171, a distributor NG tab 172, and a settings tab 173. The comment tab 171 is a tab to switch content displayed in the display field for comments, etc. 170 to comments. The distributor NG tab 172 is a tab to switch content displayed in the display field for comments, etc. 170 to content of the distributor NG setting. Content of the distributor NG setting includes setting such as turning off a display of a specific comment, rejecting a comment by a specific user, etc.

The comment display field 174 is an area that displays posted comments. The program display area 120 displays comments in real time, while the comment display field 174 also displays comments posted in the past.

(Interface for Viewing a Live-Broadcast Program)

Figure 6:
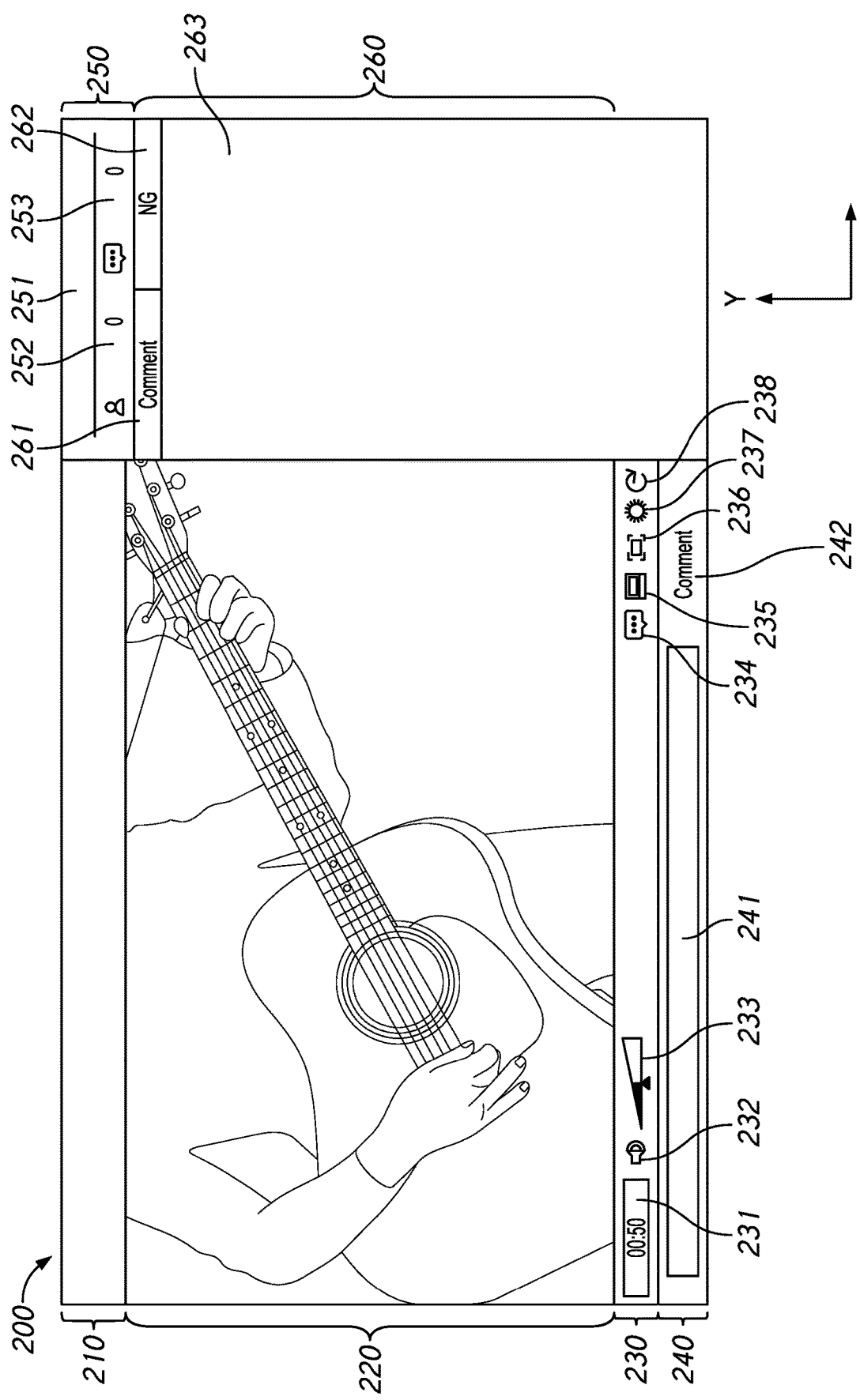
FIG. 6 The figure shows an example of an interface for viewing a live-broadcast program.

Next, an interface for viewing a live-broadcast program in the live-broadcast distribution system of the embodiment will be described. FIG. 6 shows an example of an interface for viewing a live-broadcast program 200. When distributing a live-broadcast program, for example, a user starts an application program, or starts a browser, on the terminal device 3 and displays a webpage for selecting a program (not shown here) on the display unit 30. The terminal control unit 32 executes the interface selection processing routine shown in FIG. 4 at predetermined time intervals. The webpage for selecting a program displays thumbnail images, etc. of a plurality of live-broadcast programs. The terminal control unit 32 of the terminal device 3 determines whether the distribution preparation button was clicked, as shown in FIG. 4 (FIG. 4: S30). When the distribution preparation button is not clicked (FIG. 4: S30; NO), the terminal control unit 32 determines whether a thumbnail image, etc. of a live-broadcast program has been selected (FIG. 4: S32). The terminal control unit 32, when having determined that a thumbnail image, etc. of a live-broadcast program is not selected (FIG. 4: S32; NO), exits the interface selection processing routine. However, the terminal control unit 32, when having determined that the thumbnail image, etc. of a live-broadcast program has been selected (FIG. 4: S32; YES), makes the display unit 30 display the interface for viewing a live-broadcast program 200.

As shown in FIG. 6, the interface for viewing a live-broadcast program 200 provides an administrative comment display area 210, a program display area 220, an operation area 230, a display area for a comment input field 240, a participation status display area 160, and a display field for comments, etc. 170. The administrative comment display area 210 corresponds to the administrative comment display area 110 of the interface for distributing a live-broadcast program 100, and comments by an administrator of the live-broadcast distribution system are posted by the terminal device 3 of the distributor or the live-broadcast distribution server 1. The program display area 220 corresponds to the program display area 120 of the interface for distributing a live-broadcast program 100 and displays a live-broadcast program. When a comment is posted, the comment is also displayed on the program display area 120.

The operation area 230 provides an elapsed time display area 231, a speaker icon 232, a sound volume indicator 233, a comment display icon 234, an NG sharing function icon 235, a screen mode change icon 236, a setting icon 237, and an update icon 238. The elapsed time display area 231 corresponds to the elapsed time display area 131 of the interface for distributing a live-broadcast program 100 and displays elapsed time of a live-broadcast program.

The speaker icon 232 is an icon to switch on/off sound output as it is for the speaker icon 134 of the interface for distributing a live-broadcast program 100. The state shown in FIG. 6 illustrates that the sound output is on. When the speaker icon 51 is clicked in the state shown in FIG. 6, for example, an "X" mark is displayed on the speaker icon and the sound output is turned off. The sound volume indicator 233 is an indicator to adjust sound volume, and as the sound volume indicator 52 is moved toward the right in FIG. 6 (in the X direction in FIG. 6), the volume increases.

The comment display icon 234 is an icon to switch on/off a comment display as it is for the comment display icon 135 of the interface for distributing a live-broadcast program 100. The state shown in FIG. 6 illustrates that the comment display is on. When the comment display icon 234 is clicked in the state shown in FIG. 6, for example an "X" mark is displayed on the comment display icon 234, and the display of the display field for comments, etc. 260 is turned off The NG sharing function icon 235 is an icon to set the filtering level in order to hide unpleasant comments as it is for the NG sharing function icon 136 of the interface for distributing a live-broadcast program 100. The filtering level can be selected from "high," "medium," and "low." The screen mode change icon 236 is a button for switching the screen mode as it is for the screen mode change icon 137 of the interface for distributing a live-broadcast program 100. The screen mode includes a first mode, a second mode, and a third mode as it does for the interface for distributing a live-broadcast program 100. In the state shown in FIG. 6, the first mode is selected as the screen mode.

The setting icon 237 is an icon for switching on/off the display of the participation status display area 250 and the display field for comments, etc. 260, as well as to make settings such as switching on/off the display of anonymous comments, as it is for the setting icon 139 of the interface for distributing a live-broadcast program 100. The update icon 238 is an icon for recovering normal operation when the image and sound of a live-broadcast program has stopped as it is for the update icon 138 of the interface for distributing a live-broadcast program 100. Clicking the update icon 238 reloads [data].

The participation status display area 250 corresponds to the participation status display area 160 of the interface for distributing a live-broadcast program 100 and provides a distributor ID display area 251, a display area for the number of viewers 252, and a display area for the number of comments 253. The distributor ID display area 251 displays a user ID of the distributor who is distributing a live-broadcast program displayed at the program display area 220. The display area for the number of viewers 252 displays the number of viewers of a live-broadcast program displayed at the program display area 220. The display area for the number of comments 253 displays the number of comments for a live-broadcast program displayed at the program display area 220.

The display field for comments, etc. 260 corresponds to the display field for comments, etc. 170 of the interface for distributing a live-broadcast program 100 and provides a comment tab 261 and an NG tab 262. The comment tab 261 is a tab to switch content displayed in the display field for comments, etc. 260 to comments. The NG tab 262 is a tab to switch content displayed in the display field for comments, etc. 260 to content of the NG setting. Content of the NG setting includes setting such as turning off a display of a specific comment, rejecting a comment by a specific user, etc.

The comment display field 263 is an area that displays posted comments. The program display area 220 displays comments in real time, while the comment display field 263 also displays comments posted in the past.

(Leave-it-to-Viewer Processing)

Figure 7:
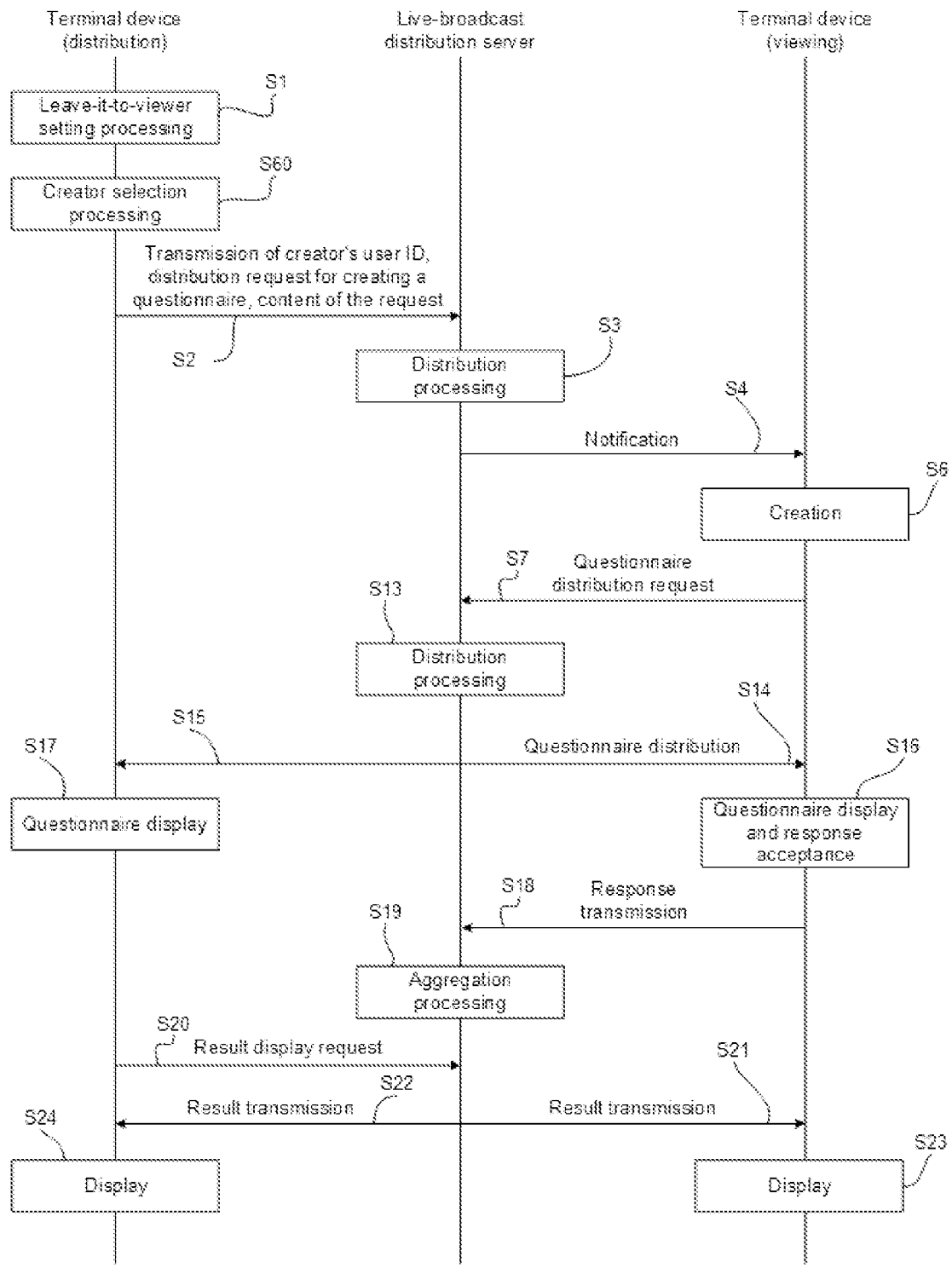
FIG. 7 The figure is a sequence diagram showing an operation of leave-it-to-viewer processing of a terminal device and a live-broadcast distribution server.
Figure 8:
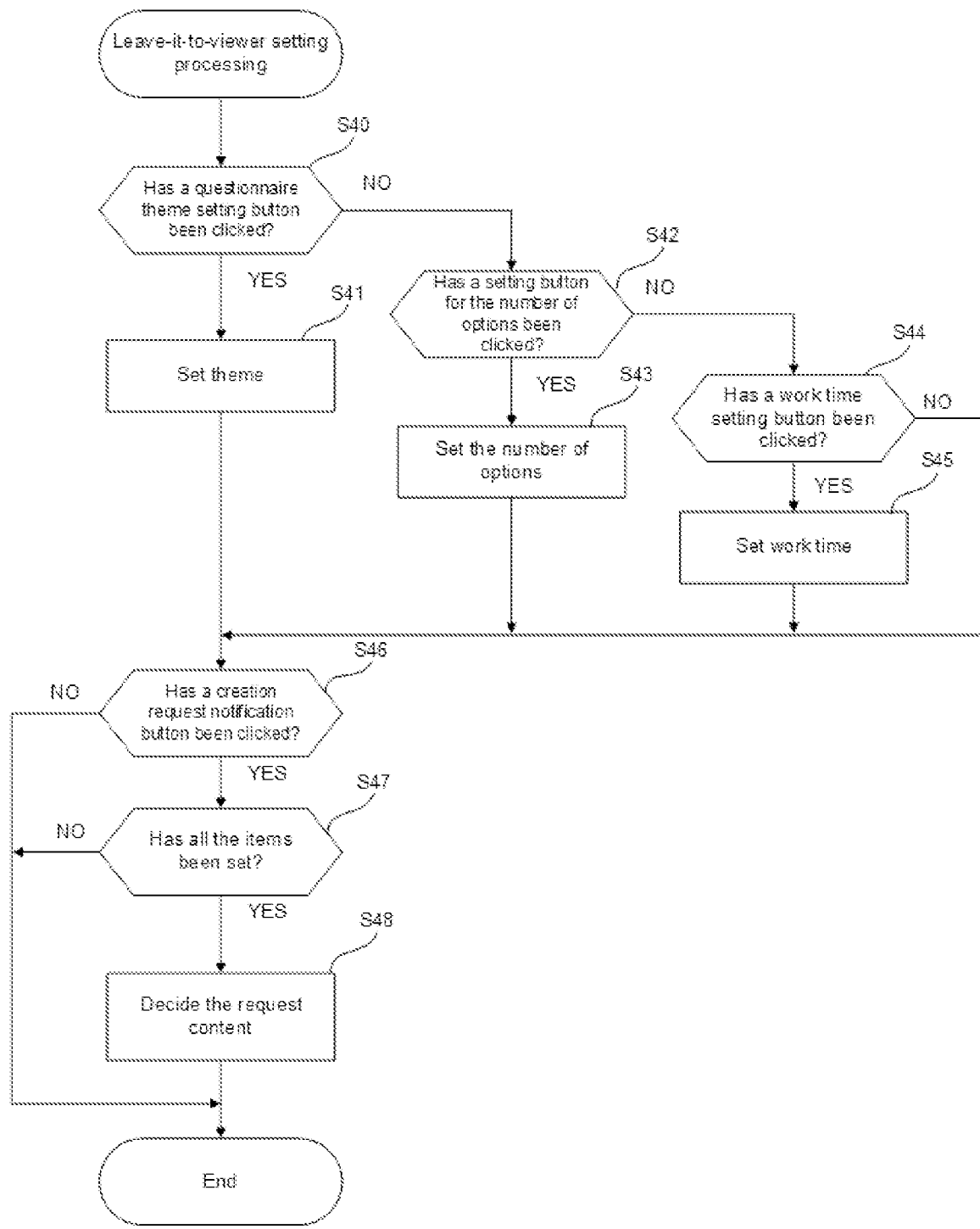
FIG. 8 The figure is a flowchart showing an operation of leave-it-to-viewer processing of a terminal device.

Next, with reference to the drawings, the operation of the terminal device 3 and the live-broadcast distribution server 1 of the embodiment will be described. FIG. 7 is a sequence diagram showing the operation of the leave-it-to-viewer processing on the terminal device 3 and the live-broadcast distribution server 1 of the live-broadcast distribution system according to this embodiment. FIG. 8 is a flowchart showing the operation of leave-it-to-viewer processing of the terminal device 3. When distributing a live-broadcast program, the distributor starts the application program on the terminal device 3 and displays the interface for distributing a live-broadcast program 100 on the display unit 30.

The distributor, on the interface for distributing a live-broadcast program 100, permits access to the camera and microphone, applies predetermined settings, and clicks the live-broadcast start button 145 displayed on the interface for distributing a live-broadcast program 100. Clicking the live-broadcast start button 145 starts the distribution processing of a live-broadcast program. Once the live-broadcast start button 145 is clicked, the terminal device 3 sends distribution data that are entered from the camera and microphone by the application program to the live-broadcast distribution server 1. The live-broadcast distribution server 1 streams the received distribution data to the terminal device of the distributor and the viewer.

In this embodiment, the distributor can request the viewer to create a questionnaire by the leave-it-to-viewer processing while distributing a live-broadcast program as described above. Hereinafter, the leave-it-to-viewer processing in this embodiment will be described in detail.

The distributor clicks the leave-it-to-viewer tab 155 and applies predetermined settings on the interface for distributing a live-broadcast program 100 shown in FIG. 5, and starts the leave-it-to-viewer processing (FIG. 7: S1). The details of the leave-it-to-viewer processing are shown in FIG. 8. The leave-it-to-viewer processing shown in FIG. 8 is executed at predetermined time intervals. As an authority granting unit, the terminal control unit 32 determines whether the questionnaire theme setting button 156b was clicked (FIG. 8: S40). When having determined that the setting button 156b was clicked (FIG. 8: S40: YES), the terminal control unit 32 as an authority granting unit stores the theme entered in the questionnaire theme field 156a into the storage unit 34 of the terminal device 3 (FIG. 8: S41). When the setting button 156b was clicked with an empty input field 156a, the storage unit 34 may store null, or the setting button 156b may be configured in a way that it cannot be clicked when the input field 156a is empty. When the questionnaire theme is null, the theme may be handled as an open theme.

Next, the terminal control unit 32 determines whether the creation request notification button 159 was clicked (FIG. 8: S46). When having determined that the creation request notification button 159 was not clicked (FIG. 8: S46; NO), the terminal control unit 32 exits the leave-it-to-viewer processing routine. When having determined that the questionnaire theme setting button 156b was not clicked (FIG. 8: S40; NO), the terminal control unit 32 determines whether the setting button for the number of options 157b was clicked (FIG. 8: S42). When having determined that the setting button 157b was clicked (FIG. 8: S42: YES), the terminal control unit 32 as an authority granting unit stores the number of options entered in the input field for the number of options 157a into the storage unit 34 of the terminal device 3 (FIG. 8: S43). When the setting button 157b was clicked with an empty input field 157a, the storage unit 34 may store null, or the setting button 157b may be configured in a way that it cannot be clicked when the input field 157a is empty. When the number of options is null, the number of options may be considered arbitrary.

Next, the terminal control unit 32 determines whether the creation request notification button 159 was clicked (FIG. 8: S46). When having determined that the creation request notification button 159 was not clicked (FIG. 8: S46; NO), the terminal control unit 32 exits the leave-it-to-viewer processing routine. When having determined that the theme setting button 156b was not clicked (FIG. 8: S40; NO), and that the setting button for the number of options 157b was not clicked (FIG. 8: S42), the terminal control unit 32 determines whether the work time setting button 158b was clicked (FIG. 8: S44). When having determined that the setting button 158b was clicked (FIG. 8: S44: YES), the terminal control unit 32 as an authority granting unit stores the work time entered in the input field for the number of work time 158a into the storage unit 34 of the terminal device 3 (FIG. 8: S45). When the setting button 158b was clicked with an empty input field 158a, the storage unit 34 may store null, or the setting button 158h may be configured in a way that it cannot be clicked when the input field 158a is empty. When the work time is null, a predetermined value may be considered as work time.

Next, the terminal control unit 32 determines whether the creation request notification button 159 was clicked (FIG. 8: S46). When having determined that the creation request notification button 159 was clicked (FIG. 8: S46; YES), the terminal control unit 32 determines whether all the items of the questionnaire theme, the number of options, and the work time were stored in the storage unit 34 (FIG. 8: S47). When having determined that not all the items were stored in the storage unit 34 (FIG. 8: S47; NO), the terminal control unit 32 exits the leave-it-to-viewer processing routine. However, when having determined that all the items were stored in the storage unit 34 (FIG. 8: S47; YES), the terminal control unit 32 decides the request content to be the content stored in the storage unit 34 (FIG. 8: S48) and exits the leave-it-to-viewer setting processing routine.

Figure 13:
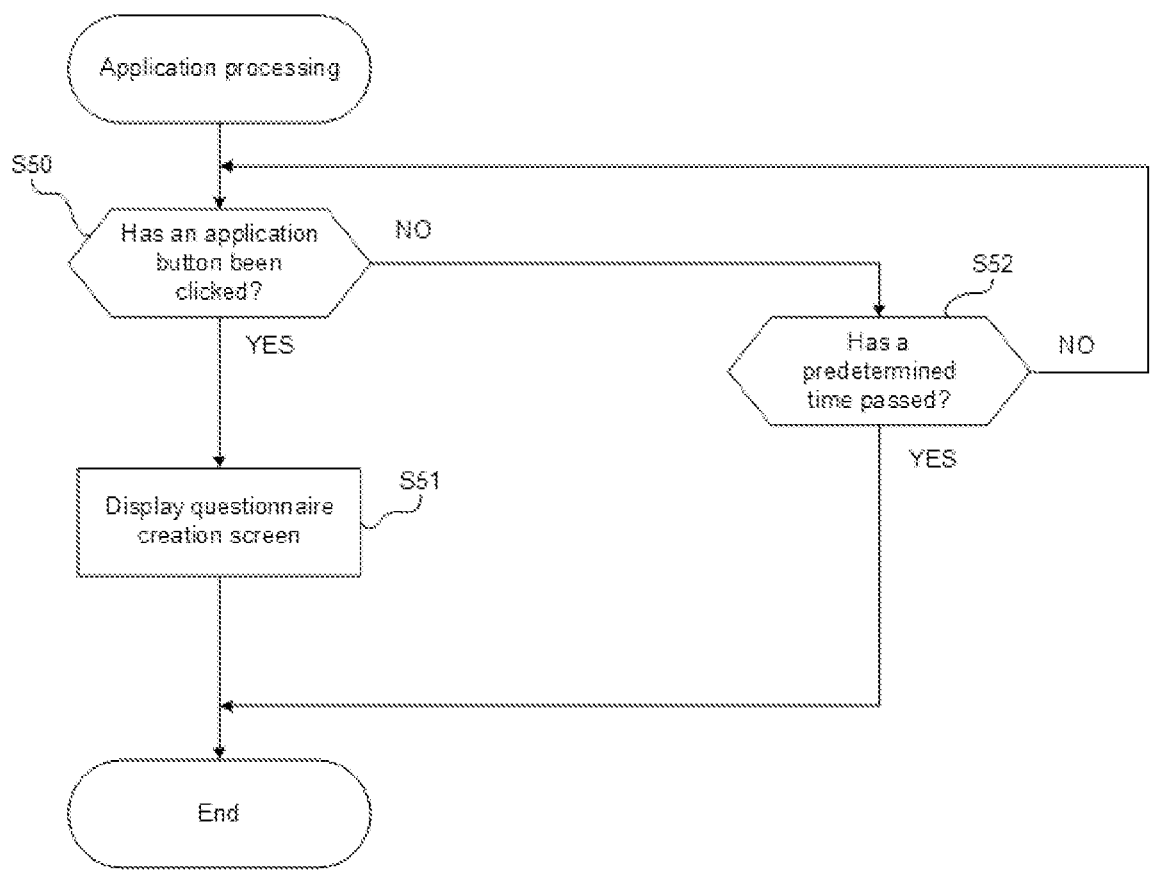
FIG. 13 The figure is a flowchart showing an application processing routine of a terminal device.

As in the description of FIG. 7, the terminal control unit 32 functioning as an authority granting unit conducts selection processing of a questionnaire creator (FIG. 13: S60). For example, by clicking a comment displayed on the display field for comments, etc. 170 of the interface for distributing a live-broadcast program 100, the viewer who posted the comment is selected as a questionnaire creator. Also, by providing a new search window on the interface for distributing a live-broadcast program 100, a questionnaire creator may be selected based on a search by entering a username, etc. in the search window.

The terminal control unit 32 as an authority granting unit sends the user ID of the selected questionnaire creator, a distribution request for creating a questionnaire, and the content of the request (FIG. 7: S2). When receiving the distribution request and its content from the terminal device 3, the live-broadcast distribution server 1 conducts distribution processing of the questionnaire creation request to the viewer (FIG. 7: S3). The live-broadcast distribution server 1 notifies the questionnaire creation request to the viewer with the received user ID of the questionnaire creator (FIG. 7: S4). The terminal control unit 32 of the terminal device 3 that received the notification from the live-broadcast distribution server 1 functions as the viewer content creation unit, and displays the questionnaire creation screen 300 shown in FIG. 9 on the administrative comment display area 210 of the interface for viewing a live broadcast 200.

Figure 9:
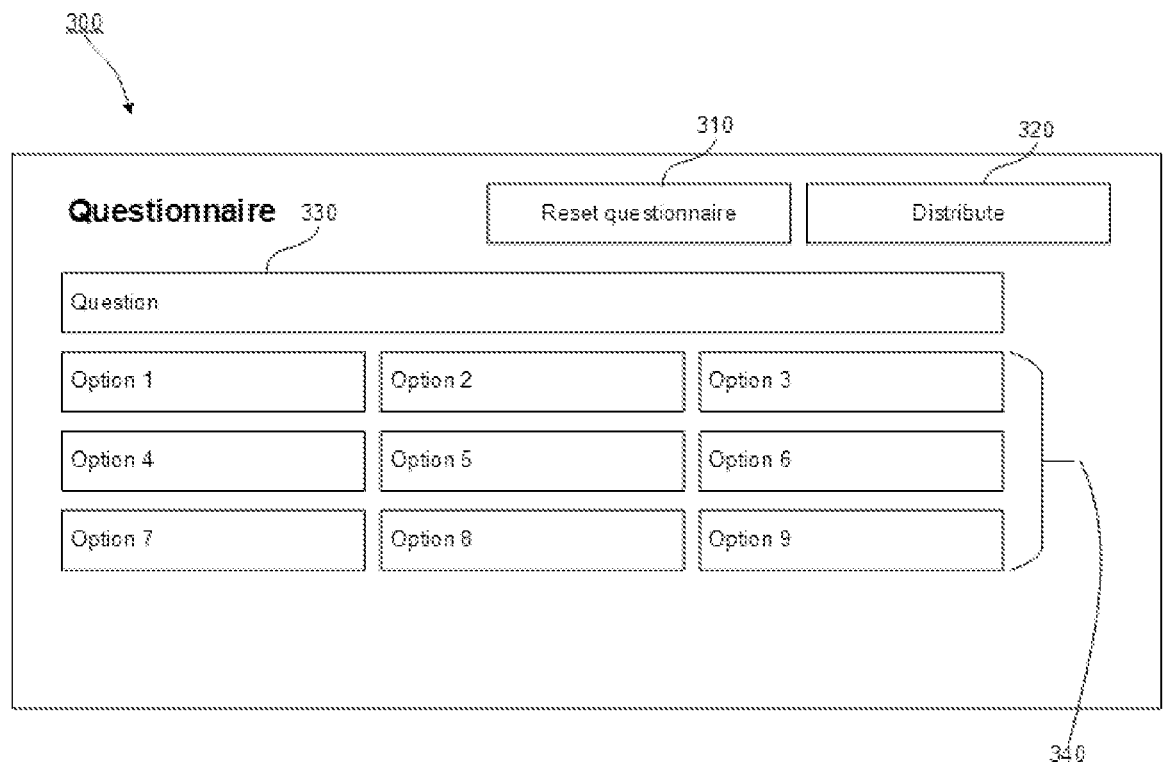
FIG. 9 The figure shows an example of a screen for creating a questionnaire.

An example of the questionnaire creation screen 300 is shown in FIG. 9. The questionnaire creation screen 300 is displayed on the program display area 220 of the interface for viewing a live-broadcast program 200 in the format of a pop-up, etc. As shown in FIG. 9, the questionnaire creation screen 300 provides a questionnaire reset button 310, a distribution button 320, a question item entry field 330, and an option entry field 340. Based on the questionnaire theme and the number of options provided in the request content, the viewer enters questionnaire question items in the question item entry field 330 and questionnaire response options in the option entry field 340. The terminal control unit 32 functioning as a viewer content creation unit stores the content entered by the viewer as the questionnaire content in the storage unit 34 to conduct questionnaire creation processing (FIG. 7: S6).

The viewer, having completed the entry to the question item entry field 330 and the option entry field 340, clicks the distribution button 320. Having determined that the distribution button 320 was clicked, the terminal control unit 32 functioning as a content distribution unit reads the content entered in the question item entry field 330 and the option entry field 340, and completes the questionnaire creation processing.

As shown in FIG. 7, the terminal control unit 32 functioning as a content distribution unit sends a questionnaire distribution request along with the read content to the live-broadcast distribution server 1 (FIG. 7: S7). The live-broadcast distribution server 1 that received the questionnaire content and the distribution request executes the questionnaire distribution processing (FIG. 7: S13). The live-broadcast distribution server 1 distributes the received questionnaire content to the terminal devices 3 of the viewer and the distributor (FIG. 7: S14, S15).

Figure 10:
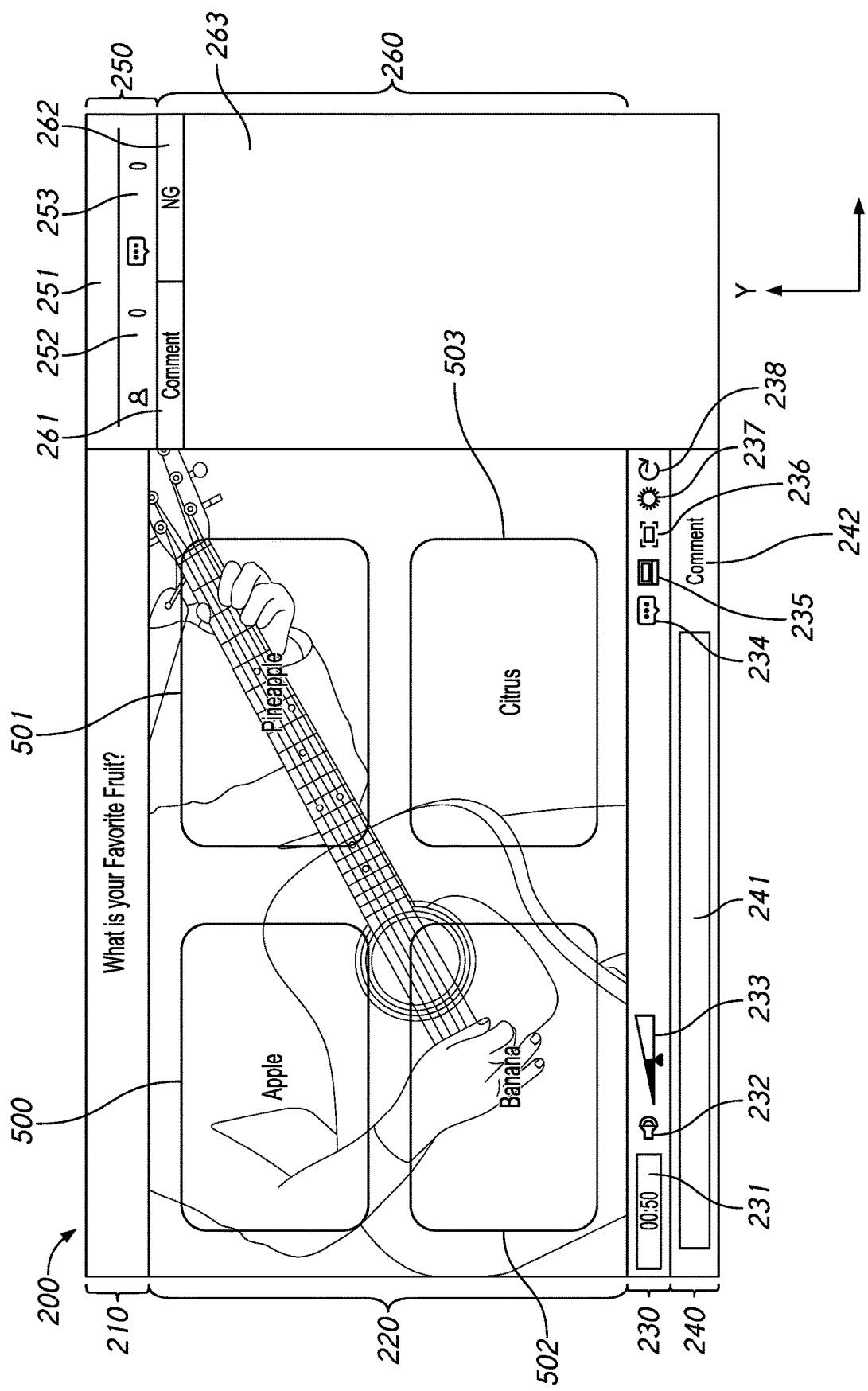
FIG. 10 The figure shows an example of a questionnaire display.

The terminal control unit 32 of the terminal device 3 of the viewer that received the questionnaire accepts responses from the viewers while displaying the questionnaire content on the interface for viewing a live-broadcast program 200 (FIG. 7: S16). Additionally, the terminal control unit 32 of the terminal device 3 of the distributor that received the questionnaire displays the questionnaire content on the interface for distributing a live-broadcast program 100 (FIG. 7: S17). By this, the content created by the viewer is incorporated in the program being broadcasted. FIG. 10 shows an example of a questionnaire display. As shown in FIG. 10, the question items are displayed on the administrative comment display area 210, and the options are displayed in the response fields 500, 501, 502, and 503. The number of response fields are changed according to the number of options.

The viewers can answer the questionnaire by clicking any of the response fields 500, 501, 502, and 503. When having determined that any of the response fields 500, 501, 502, and 503 was clicked, the terminal control unit 32 sends the option content that corresponds to the clicked response field as the questionnaire response to the live-broadcast distribution server 1 (FIG. 7: S18).

The live-broadcast distribution server 1 conducts aggregation processing of the questionnaire responses for a predetermined time. The predetermined time may be time defined in advance, or set by the distributor (FIG. 7: S19).

Figure 11:
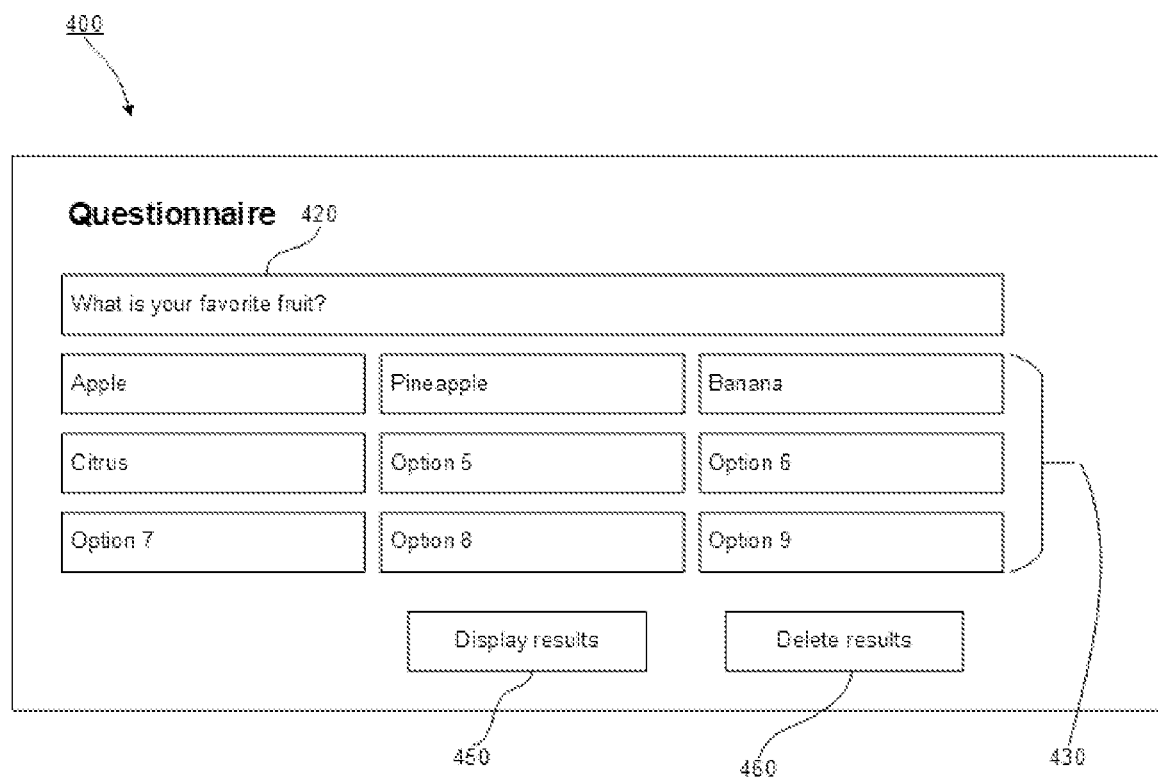
FIG. 11 The figure an example of a screen for confirming a questionnaire

On the other hand, a questionnaire confirmation screen 400 is displayed on the interface for distributing a live-broadcast program 100 of the display unit 30 of the distributor's terminal device 3 as shown in FIG. 11. The questionnaire confirmation screen 400 shown in FIG. 11 provides a question item field 420, an option field 430, a result display button 450, and a result delete button 460. In an example shown in FIG. 11, the question item of the questionnaire is displayed as a question "What is your favorite fruit?", and "Apple," "Pineapple," "Banana," and "Citrus" as options. In this state, when having determined that the result display button 450 of the questionnaire confirmation screen 400 was clicked, the terminal control unit 32 sends a questionnaire result display request to the live-broadcast distribution server 1 (FIG. 7: S20), The live-broadcast distribution server 1 that received the result display request sends the aggregation results of the questionnaire to the terminal devices 3 of the distributor and the viewer (FIG. 7: S21, S22). The terminal control unit 32 of the viewer's terminal device 3 that received the aggregation results displays the aggregation results of the questionnaire on the interface for viewing a live-broadcast program 200. Additionally, the terminal control unit 32 of the distributor's terminal device 3 that received the aggregation results displays the aggregation results of the questionnaire on the interface for distributing a live-broadcast program 100. As a display method of the results, for example, [the results] are displayed in percentiles such as "xx %" in the response fields 500, 501, 502, and 503.

In this embodiment, when a questionnaire is not created within the questionnaire creation time provided by the distributor, information to cancel the questionnaire creation request may be sent from the distributor's terminal device 3 to the live-broadcast distribution server 1 to cancel the processing related to the questionnaire creation request as well as the questionnaire distribution. Also, a force shutdown button may be displayed on the leave-it-to-viewer tab 155 etc. of the interface for distributing a live-broadcast program 100, and send information on the force shutdown of the questionnaire creation request to the live-broadcast distribution server from the distributor's terminal device 3 by the distributor's clicking the force shutdown button. In this case, the processing related to the questionnaire creation request and the questionnaire distribution on the live-broadcast distribution server 1 are forced to shut down.

As described above, according to this embodiment, since the distributor grants authority to create a questionnaire to a viewer who then creates a questionnaire, the distributor can distribute a questionnaire without delaying the progress of the distribution of a live-broadcast program even when the distributor cannot provide an assistant next to him/her.

The selection processing of a questionnaire creator shown in the step S60 may be conducted by the terminal control unit 32 functioning as an authority granting unit of the distributor's terminal device 3 by randomly extracting and selecting a questionnaire creator from a viewer list, etc., instead of the distributor conducting the selection. The viewer list, etc. is stored in the storage unit 10 of the live-broadcast distribution server 1, from which the list, etc. may be sent to the terminal device 3 based on a transmission request from the terminal control unit 32 to the live-broadcast distribution server 1.

The selection processing of a questionnaire creator shown in the step S60 may be conducted by the terminal control unit 32 functioning as an authority granting unit of the distributor's terminal device 3 by extracting and selecting a user such as a viewer under a specific condition, instead of the distributor conducting the selection. A specific condition may be, for example, the 300th user who posted a comment among the viewers who posted comments. Additionally, a specific condition may be designated by the distributor so that a user such as a viewer who meets the distributor's intention is extracted and selected.

Second Embodiment

Figure 12:
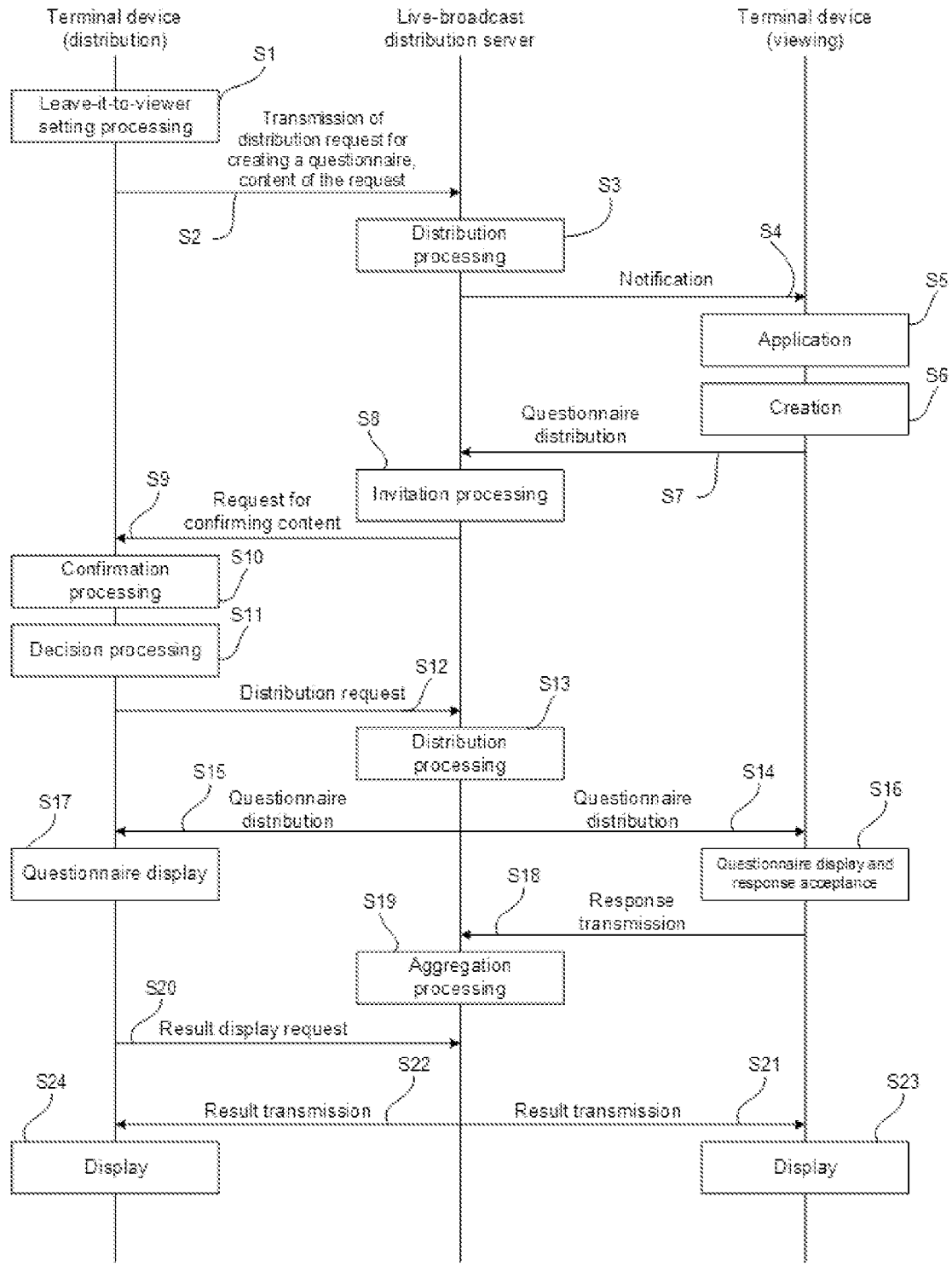
FIG. 12 The figure is a sequence diagram showing an operation of a terminal device and a live-broadcast distribution server of a live-broadcast distribution system of a second embodiment of the embodiments.

Hereinafter, the second embodiment will be described with reference to the drawings. FIG. 12 is a sequence diagram showing the operation of a terminal device and a live-broadcast distribution server of a live-broadcast distribution system according to this embodiment.

According to the first embodiment, a specific viewer is requested to create a questionnaire. This embodiment is different from the first embodiment in that the distributor considers that all viewers are questionnaire creators.

FIG. 12 is a sequence diagram corresponding to the sequence diagram in FIG. 7 of the first embodiment. In FIG. 12, the items that are common in FIG. 7 are given the same reference signs. As shown in FIG. 12, in this embodiment, after the completion of the leave-it-to-viewer setting processing (FIG. 12: S1), request content are sent along with a distribution request of a questionnaire creation request to the live-broadcast distribution server 1 (FIG. 12: S2). When receiving the distribution request and its content from the terminal device 3, the live-broadcast distribution server 1 conducts distribution processing of the questionnaire creation request to the viewer (FIG. 12: S3). The live-broadcast distribution server 1 confirms viewers who are viewing the live-broadcast program and notifies the viewers of the questionnaire creation request (FIG. 12: S4). The terminal device 3 that received the notification from the live-broadcast distribution server 1 either displays the notification on the administrative comment display area 210 of the interface for viewing the live-broadcast program 200 or displays the notification on the program display area 220 in the format of a pop-up, etc. The display of the notification includes the fact that there is a request by the distributor for creating a questionnaire, as well as the request content including a questionnaire theme, the number of options, and work time. Additionally, the display of the notification includes an application button or a link display for indicating [a viewer's] response to apply for the questionnaire creation.

The terminal device 3 conducts application processing after the display of the notification (FIG. 12: S5). The details of the application processing routine on the terminal device 3 are shown in FIG. 13. As shown in FIG. 13, the terminal control unit 32 determines whether the application button or the link display provided in the notification display was clicked (FIG. 13: S50). When having determined that the application button or the link display was not clicked (FIG. 13: S50; NO), the terminal control unit 32 determines whether the predetermined time has passed since the application processing started (FIG. 13: S52). The predetermined time may be time determined in advance or determined by the distributor who requests the questionnaire creation. When having determined that the predetermined time has not passed (FIG. 13: S52; NO), the terminal control unit 32 returns to the processing of the step S50. When having determined that the predetermined time has passed without the application button or the link display being clicked (FIG. 13: S52; YES), the terminal control unit 32 ends the application processing routine.

On the other hand, when having determined that the application button or the link display was clicked (FIG. 13: S50; YES), the terminal control unit 32 displays a questionnaire creation screen on the display unit 30 and ends the application processing.

The description goes back to FIG. 12. When the application processing ends, the terminal control unit 32 conducts the questionnaire creation processing (FIG. 12: S6). When the application processing has ended without the application button or the link display being clicked, the creation processing of the step S6 is skipped.

Figure 14:
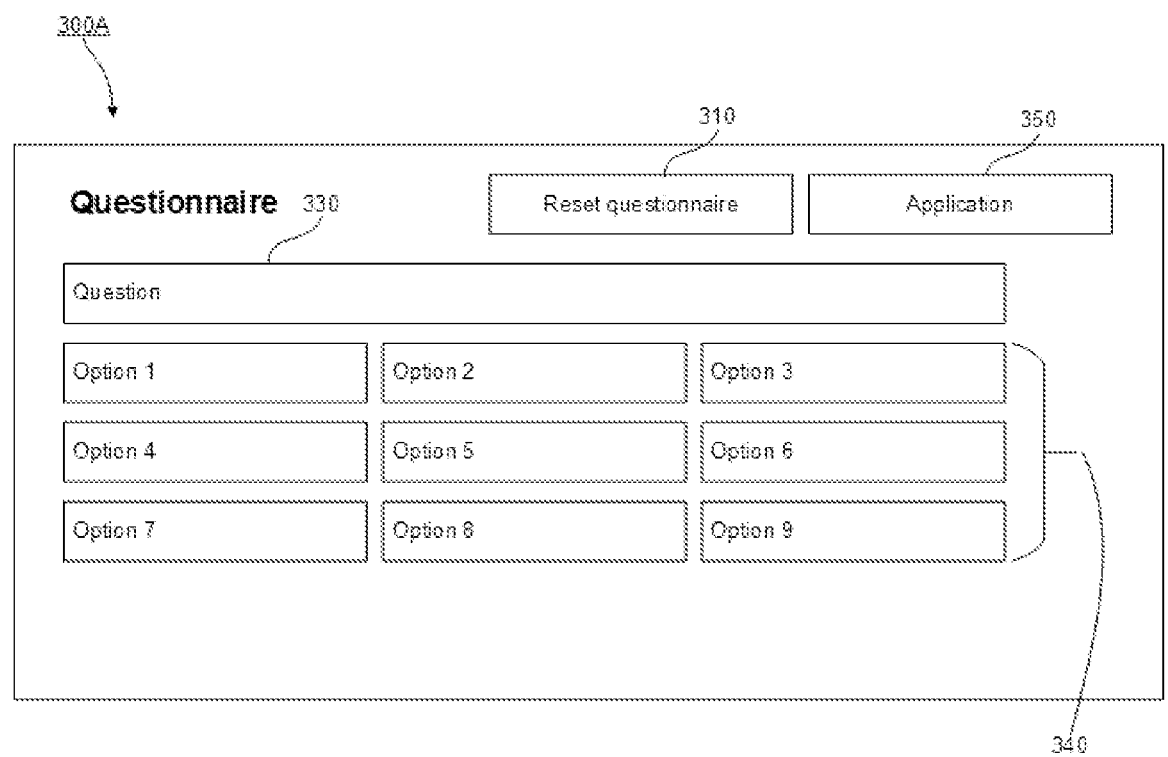
FIG. 14 The figure shows an example of a screen for creating a questionnaire.

The terminal control unit 32 functioning as a viewer content creation unit conducts the questionnaire creation processing by reading the content entered on the questionnaire creation screen. An example of the questionnaire creation screen 300A is shown in FIG. 14. The questionnaire creation screen 300A is displayed on the program display area 220 of the interface for viewing a live-broadcast program 200 in the format of a pop-up, etc. As shown in FIG. 14, the questionnaire creation screen 300A provides a questionnaire reset button 310, an application button 350, a question item entry field 330, and an option entry field 340. Based on the questionnaire theme and the number of options provided in the request content, the viewer enters questionnaire question items in the question item entry field 330 and questionnaire response options in the option entry field 340.

The viewer, having completed the entry to the question item entry field 330 and the option entry field 340, clicks the application button 350. Having determined that the application button 350 was clicked, the terminal control unit 32 functioning as a viewer content creation unit reads the content entered in the question item entry field 330 and the option entry field 340 to complete the questionnaire creation processing.

As shown in FIG. 12, the terminal control unit 32 sends the read content to the live-broadcast distribution server 1 (FIG. 12: S7). The terminal control unit 32 also sends the user ID of the viewer who created the questionnaire.

The live-broadcast distribution server 1 conducts the questionnaire invitation processing from a plurality of the terminal devices 3 until the work time provided in the request content passes (FIG. 12: S8). If there was no questionnaire application until the work time passed, the processing related to the questionnaire distribution may be cancelled. The live-broadcast distribution server 1 stores the transmitted user ID and questionnaire content in the storage unit 10 during the invitation processing. The live-broadcast distribution server 1 sends a questionnaire content confirmation request to the terminal device 3 of the distributor who requested the questionnaire creation (FIG. 12: S9). The content confirmation request includes a list containing the questionnaire question items.

When receiving the content confirmation request and the list from the live-broadcast distribution server 1, the terminal control unit 32 of the terminal device 3 functioning as a content confirmation unit displays the list on the interface for distributing a live-broadcast program 100 in the format of a pop-up, etc. and conducts the confirmation processing (FIG. 12: S10). The list, for example, displays the question items of the questionnaire. The question items displayed in the list are linked to the questionnaire content stored in the storage unit 10 of the live-broadcast distribution server 1. When having determined that the question items were clicked by the distributor, the terminal control unit 32 functioning as a content confirmation unit reads the linked questionnaire content from the live-broadcast distribution server 1 and displays [the content] on the interface for distributing a live-broadcast program 100 as a confirmation screen in the format of a pop-up, etc.

Figure 15:
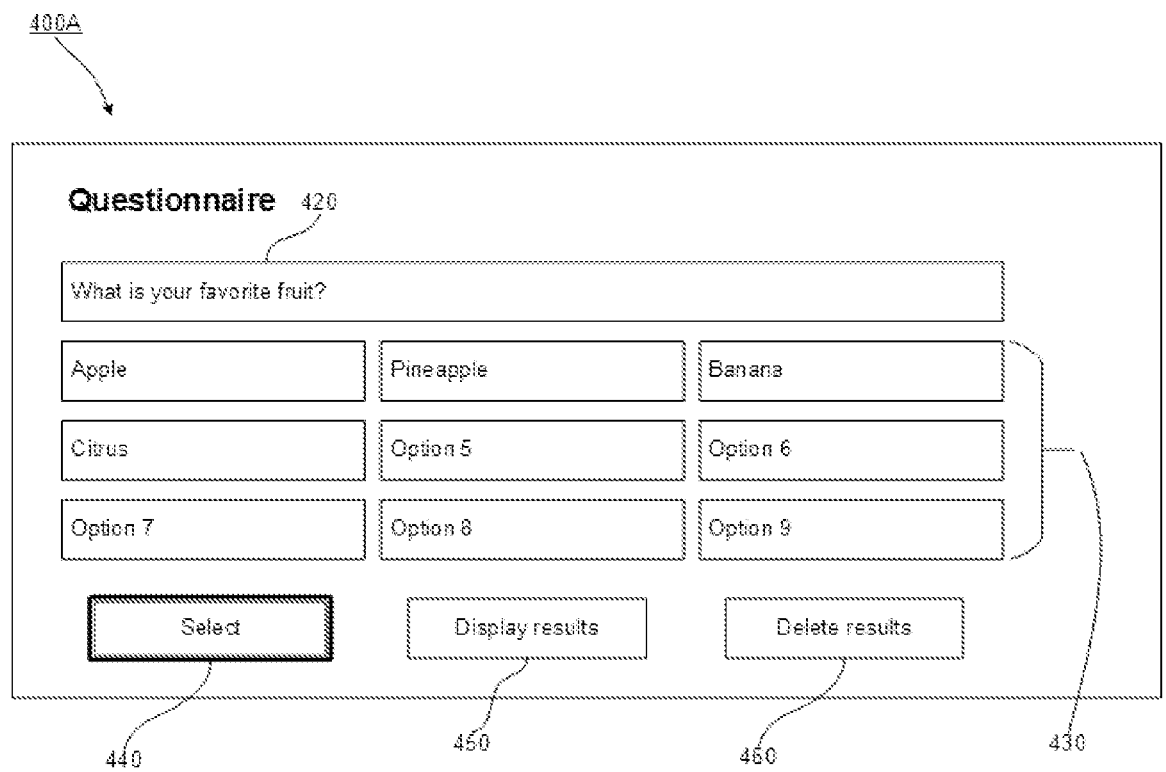
FIG. 15 The figure shows an example of a screen for confirming a questionnaire.

FIG. 15 shows an example of a questionnaire confirmation screen 400A. The questionnaire confirmation screen 400A provides a question item field 420, an option field 430, a select button 440, a result display button 450, and a result delete button 460. The distributor can confirm the questionnaire content in the questionnaire confirmation screen 400. In an example shown in FIG. 15, the question item of the questionnaire is displayed as a question "What is your favorite fruit?", and "Apple," "Pineapple," "Banana," and "Citrus" as options.

When having determined that the select button 440 was clicked, the terminal control unit 32 functioning as a distribution permission decision unit conducts the decision processing of a questionnaire to be distributed (FIG. 12: S11). The terminal control unit 32 functioning as a distribution permission decision unit sends information specifying the questionnaire on which the select button 440 was clicked as well as a distribution request of the questionnaire to the live-broadcast distribution server 1 (FIG. 12: S12). Information specifying the decided questionnaire may be indicated by adding a questionnaire ID to each questionnaire, or indicating the ranking of the questionnaire on the list.

The live-broadcast distribution server 1 that received information specifying a questionnaire and a distribution request of the questionnaire executes the questionnaire distribution processing (FIG. 12: S13). Since the processing shown in FIG. 12 after this step is the same as the processing shown in FIG. 7, its description is omitted.

In this embodiment, when the questionnaire confirmation processing is not completed within the questionnaire creation time provided by the distributor, information to cancel the questionnaire creation request may be sent from the distributor's terminal device 3 to the live-broadcast distribution server 1 to cancel the processing related to the questionnaire creation request as well as the questionnaire distribution. Also, a force shutdown button may be displayed on the leave-it-to-viewer tab 155 etc. of the interface for distributing a live-broadcast program 100 displayed on the distributor's terminal device 3 to send information on the force shutdown of the questionnaire creation request to the live-broadcast distribution server 1 from the distributor's terminal device 3 by the distributor's clicking the force shutdown button. In this case, the processing related to the questionnaire creation request and the questionnaire distribution on the live-broadcast distribution server is forced to shut down.

As described above, according to this embodiment, since the distributor grants authority to create a questionnaire to a viewer who then creates a questionnaire, the distributor can distribute a questionnaire without delaying the progress of the distribution of a live-broadcast program even when the distributor cannot provide an assistant next to him/her.

Additionally, according to this embodiment, the task to select a questionnaire creator by the distributor can be omitted, the distributor can much more easily distribute a questionnaire without delaying the distribution of the live-broadcast program even when the distributor cannot provide an assistant next him/her.

Third Embodiment

Figure 16:
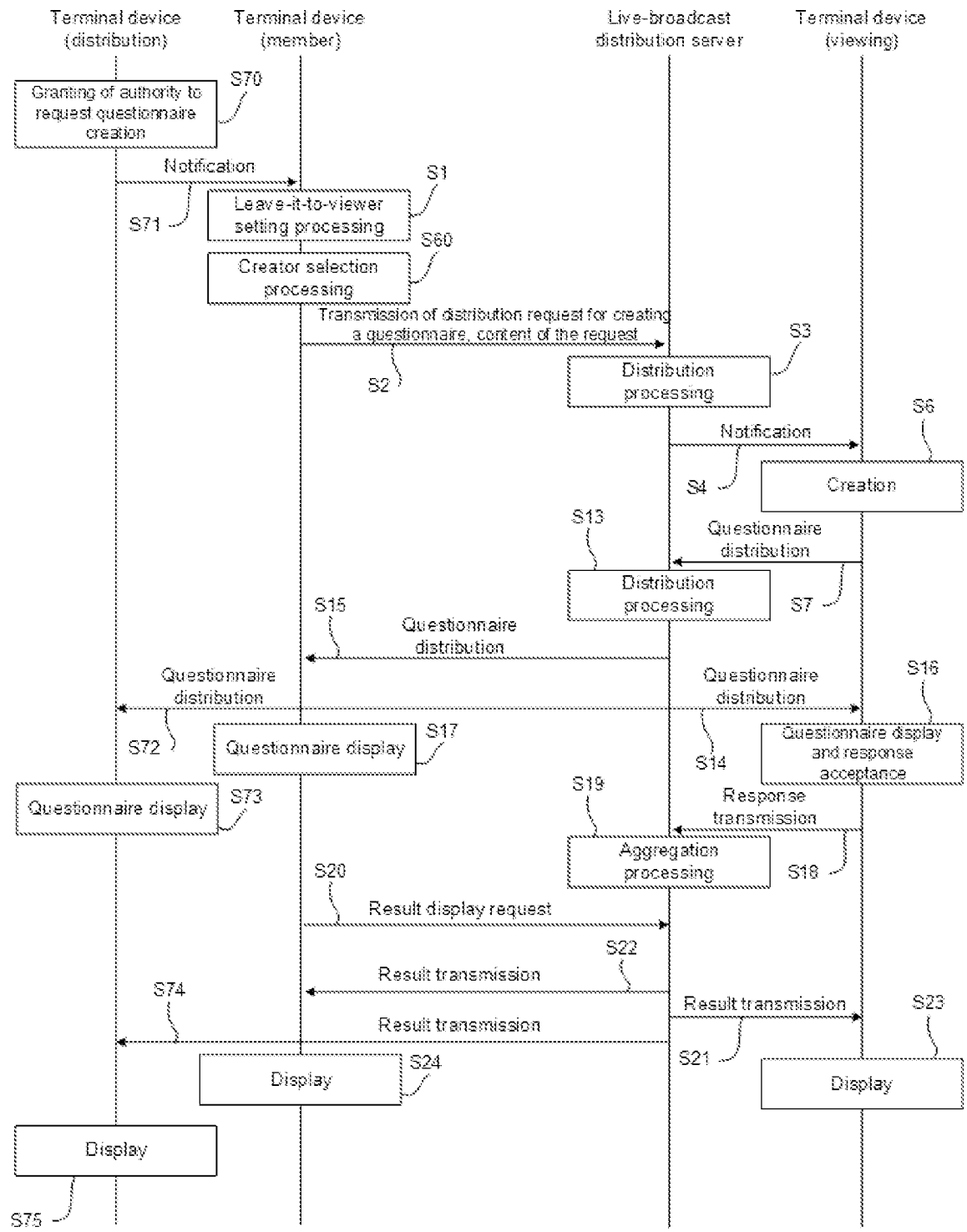
FIG. 16 The figure is a sequence diagram showing an operation of a terminal device and a live-broadcast distribution server of a live-broadcast distribution system of a third embodiment of the embodiments.

Hereinafter, the third embodiment will be described with reference to the drawings. FIG. 16 is a sequence diagram showing the operation of a terminal device and a live-broadcast distribution server of a live-broadcast distribution system according to the embodiment.

In each of the embodiments described above, the aspect in which the live-broadcast distributor has the original authority to request questionnaire creation was described. However, the present invention is not limited to such aspect, and it is possible to configure in a way that the distributor grants authority to request questionnaire creation to other users. FIG. 16 is a sequence diagram corresponding to the sequence diagram in FIG. 7 of the first embodiment. In FIG. 162, the items that are common in FIG. 7 are given the same reference signs.

Targets whom the authority to request questionnaire creation is granted may be, for example, members of a group called a community. In order to distribute live broadcast, it is sometimes required to register to a community as a member or create a new community. When a plurality of members are registered in a community, the live-broadcast distributor may grant the authority to request questionnaire creation to the community members. In this case, since the community members are not necessarily viewing the live broadcast, the distributor sends a message to the community member in some way.

As shown in FIG. 16, the terminal control unit 32 of the distributor's terminal device 3 functioning as a unit that grants authority to request questionnaire creation grants the authority to request questionnaire creation to a member selected from the community members' list (FIG. 16: S70). In this case, for example, the community members' list may be displayed on the interface for distributing a live-broadcast program 100 to enable the selection of a member by the distributor.

When having determined that a community member was selected, the terminal control unit 32 notifies the member that the authority to request [questionnaire] creation has been granted to him/her (FIG. 16: S71). As described above, in this case, since it is possible that the member is not viewing the live broadcast, the notification may be done by using an email or applications such as Messenger. If the member is viewing the live broadcast, the notification can be done on the interface for viewing the live-broadcast program 200, which is displayed on the display unit 30 of the member's terminal device 3, in the format of, for example, a pop-up, etc.

When the notification described above is accepted by the member, the terminal control unit 32 of the member's terminal device 3 conducts the leave-it-to-viewer setting processing in the same way as in the first embodiment (FIG. 16: S1). When the member is not viewing the live broadcast, a screen corresponding to the leave-it-to-viewer tab 155, which was described in the first embodiment, may be displayed on the display unit 30 of the member's terminal device.

In this embodiment, since the member who accepted the notification described above conducts a request for questionnaire creation, etc. on behalf of the distributor, processing from the step S2 to the step S24 shown in FIG. 16 are the same as in the first embodiment. The questionnaire distribution (FIG. 16: S72) and display (FIG. 16: S73), as well as the questionnaire result transmission (FIG. 16: S74) and display (FIG. 16: S75), may be done to or on the distributor's terminal device 3.

As described above, according to this embodiment, since the terminal control unit 32 grants the authority to request questionnaire creation to a member, tasks related to a questionnaire by the distributor can be omitted, and the distributor can much more easily distribute a questionnaire without delaying the distribution of the live-broadcast program even when the distributor cannot provide an assistant next to him/her.

The granting of the authority to request questionnaire creation may not be limited to community members, but it can be granted to a specific viewer. Also, the second embodiment can be applied to the processing after the processing of granting the authority to request questionnaire creation.

Fourth Embodiment

Figure 17:
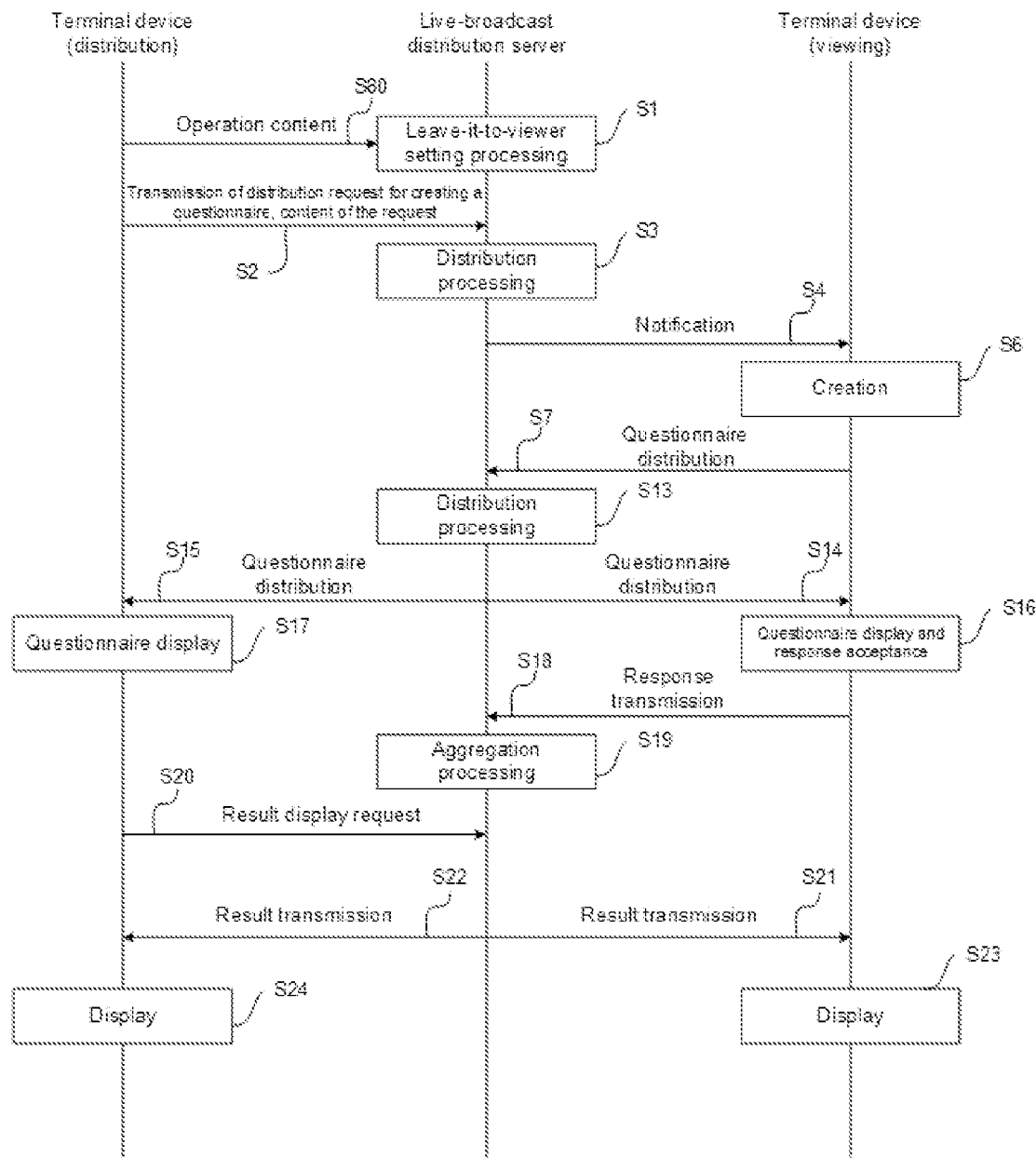
FIG. 17 The figure is a sequence diagram showing an operation of a terminal device and a live-broadcast distribution server of a live-broadcast distribution system of a fourth embodiment of the embodiments.

Hereinafter, the fourth embodiment will be described with reference to the drawings. FIG. 17 is a sequence diagram showing the operation of a terminal device and a live-broadcast distribution server of a live-broadcast distribution system according to this embodiment.

In each of the embodiments described above, the aspect in which the terminal control unit 32 of the terminal device 3 executes the processing related to a request for questionnaire creation was described. However, the present invention is not limited to such aspect, and the server control unit 11 of the live-broadcast distribution server 1 may execute the processing related to the request for questionnaire creation in place of the terminal control unit 32.

FIG. 17 is a sequence diagram corresponding to the sequence diagram in FIG. 7 of the first embodiment. In FIG. 17, the items that are common in FIG. 7 are given the same reference signs.

In this embodiment, the content of the operation conducted on the interface for distributing a live-broadcast program 100 that is displayed on the display unit 30 of the distributor's terminal device 3 are sent to the live-broadcast distribution server 1 (FIG. 17: S80, S81). The operation content includes a user ID of a specific viewer selected by the distributor as a content creator. The server control unit 11 of the live-broadcast distribution server 1 that received the operation content executes the processing such as the leave-it-to-viewer setting, etc. Therefore, the processing shown in FIG. 4 and FIG. 8 are done by the server control unit 11 functioning as an authority granting unit, a viewer content creation unit, and a content distribution unit.

When receiving the questionnaire content in the step S7, the server control unit 11 functioning as a viewer content creation unit creates a questionnaire to be distributed; and the server control unit 11 functioning as a content distribution unit distributes the created questionnaire (FIG. 17: S13).

Since the processing content themselves are the same as in the first embodiment, the detailed description is omitted. Also, in the second and third embodiments, it is possible to use the same configuration in this embodiment and make the server control unit 11 the processing entity.

As described above, according to this embodiment, since [the distributor] grants authority to create a questionnaire to a viewer, etc. who then creates a questionnaire, the distributor can distribute a questionnaire without delaying the progress of the distribution of a live-broadcast program even when the distributor cannot provide an assistant next to him/her.

Also in this embodiment, when a questionnaire is not created within the questionnaire creation time provided by the distributor, information to cancel the questionnaire creation request may be sent from the distributor's terminal device 3 to the live-broadcast distribution server 1 to cancel the processing related to the questionnaire creation request as well as the questionnaire distribution. Also, a force shutdown button may be displayed on the leave-it-to-viewer tab 155 etc. of the interface for distributing a live-broadcast program 100 to send information on the force shutdown of the questionnaire creation request to the live-broadcast distribution server from the distributor's terminal device 3 by the distributor's clicking the force shutdown button. In this case, the processing related to the questionnaire creation request and the questionnaire distribution on the live-broadcast distribution server 1 is forced to shut down.

(Variations)

The above embodiments are examples, and various variations are possible without deviating from the scope of the present invention. In the above embodiments, the aspect in which a questionnaire is adopted, as an example of content, was described. However, the present invention is not limited to such aspect. For example, a sub-display area that is smaller than the program display area 120 may be provided in the program display area 120 of the interface for distributing a live-broadcast program 100, and a sub-live-broadcast program live-streamed on the sub-display area can be adopted as the content.

In the above embodiments, the aspect was described, in which the terminal control unit 32 and the server control unit 11 functioning as a request content decision unit decides a questionnaire as a type of content to be created, and work time for content creation, a questionnaire theme, and the number of the questionnaire response options as the scope of the creation authority. However, the present invention is not limited to such aspect. For example, the terminal control unit 32 and the server control unit 11 functioning as a request content decision unit, may have, as the scope of the creation authority, not only the work time of content creation that is a time restriction, but also a position where the sub-live-broadcast program is displayed, i.e. a display limitation, when the sub-live-broadcast program was adopted as content.

The programs and application programs according to the above aspect can be provided in a form stored in a recording medium readable by a computer and installed in a computer. The recording medium can be, for example, a non-transitory recording medium, and an optical recording medium such as a CD-ROM, etc. may be a good example, but it can include a recording medium in any known format such as a semiconductor recording medium and magnetic recording medium, etc. It is also possible to provide the program through distribution via a communication network and install it in a computer.

A terminal device application program, a terminal device control method, a terminal device, and a live-broadcast distribution server according to the embodiments of the present invention have been described, which does not limit the present invention. Various modifications are possible in such a way they do not deviate from the scope of the present invention.

INDUSTRIAL APPLICABILITY

The present invention is applicable to a field of services where live-broadcast programs are distributed via network such as the Internet.

DESCRIPTIONS OF THE REFERENCE SIGNS

1 Live-broadcast distribution server
2 Network
3 Terminal device
11 Server control unit
32 Terminal control unit

The invention claimed is:

1. A non-transitory computer readable storage medium storing a terminal device application program executable by a computer of a terminal device, the terminal device application program having a communication function with a live-broadcast distribution server that has a distribution function of a live-broadcast program, wherein the terminal device application program enables the computer of the terminal device to execute operations comprising:
   allowing a live-broadcast distributor to request a viewer to create a questionnaire, including:
      allowing the live-broadcast distributor to determine a type of questionnaire to be created and a scope of the authority to create;
      allowing the live-broadcast distributor to enter at least one question item entry field and a plurality of option entry fields distinct from the at least one question item entry field; and
      providing an instruction including the at least one question item entry field and the plurality of option entry fields, the type of questionnaire and the scope of the authority to create;
   granting authority to create a questionnaire to a part of or all viewers based on the scope of the authority to create in the instruction;
   enabling another terminal device of the viewer of the part of or all of viewers, including:
      receiving the instruction; and
      allowing the viewer to create the questionnaire using the type of questionnaire, the at least one question item entry field and the plurality of option entry fields in the instruction; and
   incorporating the questionnaire created by the viewer into a program being live-broadcasted.

2. The non-transitory computer readable storage medium according to claim 1, wherein the operations further comprise:
   enabling confirmation of the questionnaire created by the viewer.

3. The non-transitory computer readable storage medium according to claim 2, wherein the operations further comprise:
   deciding whether to approve distribution of the questionnaire created by the viewer.

4. The non-transitory computer readable storage medium according to claim 1, wherein granting authority to create the questionnaire to the part of or all viewers based on the scope of the authority to create in the instruction comprises granting the authority to create to the viewer who is randomly extracted or the viewer under a specific condition.

5. The non-transitory computer readable storage medium according to claim 1, wherein a scope of the authority to create content includes at least one of a time restriction for creating the questionnaire, a display mode of the created questionnaire, and or a display limitation, of the content creation including a display position.

6. The non-transitory computer readable storage medium of claim 1, wherein enabling the other terminal device of the viewer of the part of or all of viewers comprises displaying a tab responsive of the instruction, the tab configured to allow the terminal device of the distributor to send a questionnaire creation request to the other terminal device via the live-broadcast distribution server, and
   wherein the questionnaire creation request includes a content of the questionnaire.

7. The non-transitory computer readable storage medium of claim 6, wherein enabling the other terminal device of the viewer of the part of or all of viewers comprises displaying a questionnaire creation screen based on the content of the questionnaire.

8. A control method of a terminal device having a function to communicate with a live-broadcast distribution server that has a distribution function of a live-broadcast program, the method comprising:
   allowing a live-broadcast distributor to request a viewer to create a questionnaire including:
      allowing the live-broadcast distributor to determine a type of questionnaire to be created and a scope of the authority to create;
      allowing the live-broadcast distributor to enter at least one question item entry field and a plurality of option entry fields distinct from the at least one question item entry field; and
      providing an instruction including the at least one question item entry field and the plurality of option entry fields, the type of questionnaire and the scope of the authority to create;
   allowing the live-broadcast distributor to grant authority to create content to a part of or all viewers based on the scope of the authority to create in the instruction;
   enabling another terminal device of the viewer of the part of or all of viewers, including:
      receiving the instruction; and
      allowing the viewer to create the questionnaire using the type of questionnaire, the at least one question item entry field and the plurality of option entry fields in the instruction; and
   incorporating the questionnaire created by the viewer into a program being live-broadcasted.

9. The control method according to claim 8, further comprising:
   enabling confirmation of the questionnaire created by the viewer.

10. The control method according to claim 9, further comprising:
    deciding whether to approve distribution of the questionnaire created by the viewer.

11. The control method according to claim 8, wherein the part of or all viewers are the viewer who is randomly extracted or the viewer under a specific condition.

12. The control method according to claim 8, wherein a scope of the authority to create includes at least one of a time restriction for creating the questionnaire, a display mode of the created questionnaire, and a display limitation, including a display position.

13. The control method of claim 8, wherein the function enabling questionnaire creation comprises:
    displaying a tab responsive of the instruction, the tab configured to allow the terminal device of the distributor to send a questionnaire creation request to the other terminal device via the live-broadcast distribution server,
    wherein the questionnaire creation request includes a content of the questionnaire.

14. A terminal device having a function to communicate with a live-broadcast distribution server that has a distribution function of a live-broadcast program, the terminal device comprising a computer configured to execute operations comprising:
    allowing a live-broadcast distributor request a viewer to create a questionnaire, including:

allowing the live-broadcast distributor to determine a type of questionnaire to be created and a scope of the authority to create;

allowing the live-broadcast distributor to enter at least one question item entry field and a plurality of option entry fields distinct from the at least one question item entry field; and providing an instruction including the at least one question item entry field and the plurality of option entry fields, the type of questionnaire and the scope of the authority to create;

granting authority to create the questionnaire to a part of or all viewers based on the scope of the authority to create in the instruction;

enabling another terminal device of the viewer of the part of or all of viewers, including:
  receiving the instruction; and
  allowing the viewer to create the questionnaire using the type of questionnaire, the at least one question item entry field and the plurality of option entry fields in the instruction; and incorporating the questionnaire created by the viewer into a program being live-broadcasted.

15. The terminal device according to claim 14, wherein the operations further comprise:
enabling confirmation of the questionnaire created by the viewer.

16. The terminal device according to claim 15, wherein the operations further comprise:
deciding whether to approve distribution of the questionnaire created by the viewer.

17. The terminal device according to claim 14, wherein granting authority to create the questionnaire to the part of or all viewers based on the instruction by the live-broadcast distributor comprises granting the authority to create to the viewer who is randomly extracted or the viewer under a specific condition.

18. The terminal device of claim 14, wherein enabling another terminal device of the viewer of the part of or all of viewers comprises displaying a tab responsive Co the instruction, the tab configured to allow the terminal device of the distributor to send a questionnaire creation request to the other terminal device via the live-broadcast distribution server, and wherein the questionnaire creation request includes a content of the questionnaire.

19. A non-transitory computer readable storage medium storing a live-broadcast distribution server program executable by a computer of a live-broadcast distribution server configured to distribute a live-broadcast program, wherein the live-broadcast distribution server program enables the computer of the live-broadcast distribution server to execute operations comprising:

allowing a live-broadcast distributor to request a viewer to create a questionnaire, including:
  allowing the live-broadcast distributor to determine a type of questionnaire to be created and a scope of the authority to create;
  allowing the live-broadcast distributor to enter at least one question item entry field and a plurality of option entry fields distinct from the at least one question item entry field; and
  providing an instruction including the at least one question item entry field and the plurality of option entry fields, the type of questionnaire and the scope of the authority to create;

granting authority to create a questionnaire to a part of or all viewers based on an instruction by a live-broadcast distributor;

enabling a terminal device of the viewer of the part of or all of viewers, including:
  receiving the instruction; and
  allowing the viewer to create the questionnaire using the type of questionnaire, the at least one question item entry field and the plurality of option entry fields in the instruction; and incorporating the questionnaire created by the viewer into a program being live-broadcasted.

20. The non-transitory computer readable storage medium of claim 19, wherein enabling the terminal device of the viewer of the part of or all of viewers comprises controlling displaying a tab responsive to the instruction, the tab configured to allow the terminal device of the distributor to send a questionnaire creation request to the other terminal device via the live-broadcast distribution server, and wherein the questionnaire creation request includes a content of the questionnaire.

* * * * *